United States Patent
Cairns

(10) Patent No.: US 7,388,152 B2
(45) Date of Patent: Jun. 17, 2008

(54) CABLE SEAL ASSEMBLY AND METHOD

(75) Inventor: James L. Cairns, Ormond Beach, FL (US)

(73) Assignee: Ocean Design, Inc., Daytona Beach, FL (US)

( * ) Notice: Subject to any disclaimer, the term of this patent is extended or adjusted under 35 U.S.C. 154(b) by 0 days.

(21) Appl. No.: 11/467,873

(22) Filed: Aug. 28, 2006

(65) Prior Publication Data

US 2007/0045003 A1    Mar. 1, 2007

Related U.S. Application Data

(60) Provisional application No. 60/712,094, filed on Aug. 29, 2005.

(51) Int. Cl.
*H02G 15/02* (2006.01)
*H01R 4/00* (2006.01)

(52) U.S. Cl. ............... 174/74 R; 174/77 R; 174/84 R; 174/88 R; 174/92

(58) Field of Classification Search ............ 174/74 R, 174/77 R, 84 R, 92, 93, 82, 88
See application file for complete search history.

(56) References Cited

U.S. PATENT DOCUMENTS

| | | | |
|---|---|---|---|
| D28,198 S | 1/1898 | Armstrong et al. | |
| 1,129,615 A | 2/1915 | Sykes | |
| 2,291,709 A | 8/1942 | Goetze | |
| 2,417,741 A | 3/1947 | Dillon | |
| 2,444,119 A | 6/1948 | Thorn et al. | |
| 2,913,262 A | 11/1959 | Cenzo et al. | |
| 3,671,046 A | 6/1972 | Hagman | |
| 3,915,461 A | 10/1975 | Gautier | |
| 4,111,234 A | 9/1978 | Wells et al. | |

(Continued)

FOREIGN PATENT DOCUMENTS

WO    WO 95/02267    1/1995

OTHER PUBLICATIONS

Applied Physics Laboratory, Reference Manual on Interference Seals and Connectors for Undersea Electrical Applications, University of Washington, Seattle, Washington, Jul. 1976.

(Continued)

*Primary Examiner*—William H Mayo, III
(74) *Attorney, Agent, or Firm*—Procopio, Cory, Hargreaves & Savitch, LLP

(57) ABSTRACT

A tubular cable seal member of elastomeric material has at least one axial slit for allowing the seal member to be installed transversely over a cable. The seal member is installed in an annular seating cavity in a housing which encloses at least part of the cable, and is squeezed between opposing surfaces of the cavity and cable to provide a sealing pressure. At the same time, opposing surfaces of the axial slit are squeezed together with the same sealing pressure. The housing may be a clamshell-like, two part housing and may have an internal chamber extending between two cable seal members which provide a seal between opposite end ports and the cable at opposite ends of the chamber. Side runner face seals extend between the cable seal members along opposite sides of the chamber to seal the chamber when the housing parts are closed together.

60 Claims, 23 Drawing Sheets

U.S. PATENT DOCUMENTS

| | | | |
|---|---|---|---|
| 4,117,259 A * | 9/1978 | Giebel et al. ................. 174/92 |
| 4,155,561 A | 5/1979 | Rudy et al. |
| 4,157,195 A | 6/1979 | Costanzo et al. |
| 4,465,330 A | 8/1984 | De Cenzo |
| 4,529,257 A | 7/1985 | Goodman et al. |
| 4,558,174 A * | 12/1985 | Massey ........................ 174/92 |
| 4,695,259 A | 9/1987 | Uchida |
| 4,733,019 A * | 3/1988 | Pichler et al. ................. 174/92 |
| 4,768,813 A | 9/1988 | Timmons |
| 4,780,091 A | 10/1988 | Shenton |
| 4,839,471 A | 6/1989 | Clark et al. |
| 4,857,672 A | 8/1989 | Rebers et al. |
| 4,874,326 A | 10/1989 | Marolda, Jr. |
| 4,909,751 A | 3/1990 | Marolda, Jr. |
| 5,245,133 A * | 9/1993 | DeCarlo et al. ............. 174/93 |
| 5,248,263 A | 9/1993 | Sakurai et al. |
| 5,267,738 A | 12/1993 | Vos |
| 5,510,577 A | 4/1996 | Corrigan |
| 5,561,268 A | 10/1996 | Dagan et al. |
| 5,639,102 A | 6/1997 | Ilesic |
| 5,675,124 A | 10/1997 | Stough et al. |
| 5,695,197 A | 12/1997 | Farley et al. |
| 5,853,030 A | 12/1998 | Walding |
| 5,873,750 A * | 2/1999 | Cairns et al. ................. 439/587 |
| 5,883,333 A * | 3/1999 | Wambeke et al. ............ 174/92 |
| 5,884,003 A | 3/1999 | Cloud et al. |
| 5,896,486 A | 4/1999 | Burek et al. |
| 5,947,533 A | 9/1999 | Fisher et al. |
| 6,045,383 A | 4/2000 | Fujiwara |
| 6,051,792 A * | 4/2000 | Damm et al. ................. 174/93 |
| 6,067,395 A | 5/2000 | Cairns et al. |
| 6,118,076 A * | 9/2000 | Damm et al. ............. 174/77 R |
| 6,177,634 B1 | 1/2001 | Smith |
| 6,314,229 B1 | 11/2001 | Sasaki et al. |
| 6,332,787 B1 | 12/2001 | Barlow et al. |
| 6,334,785 B2 | 1/2002 | Miwa |
| 6,336,472 B1 | 1/2002 | Eminger et al. |
| 6,338,492 B1 | 1/2002 | Schilling et al. |
| 6,407,338 B1 * | 6/2002 | Smith ........................ 174/92 |
| 6,475,008 B1 | 11/2002 | Marolda et al. |
| 6,573,455 B1 | 6/2003 | Radelet |
| 6,721,483 B2 * | 4/2004 | Grubish et al. ............. 385/135 |
| 6,971,413 B2 | 12/2005 | Taylor et al. |
| 6,981,704 B2 | 1/2006 | Okazaki et al. |
| 7,004,476 B2 | 2/2006 | Nakayama et al. |
| 2004/0108010 A1 | 6/2004 | Gaston et al. |
| 2004/0262851 A1 | 12/2004 | Tones et al. |

OTHER PUBLICATIONS

International Preliminary Examination Report of Mar. 13, 2008, PCT/US2006/034317.

* cited by examiner

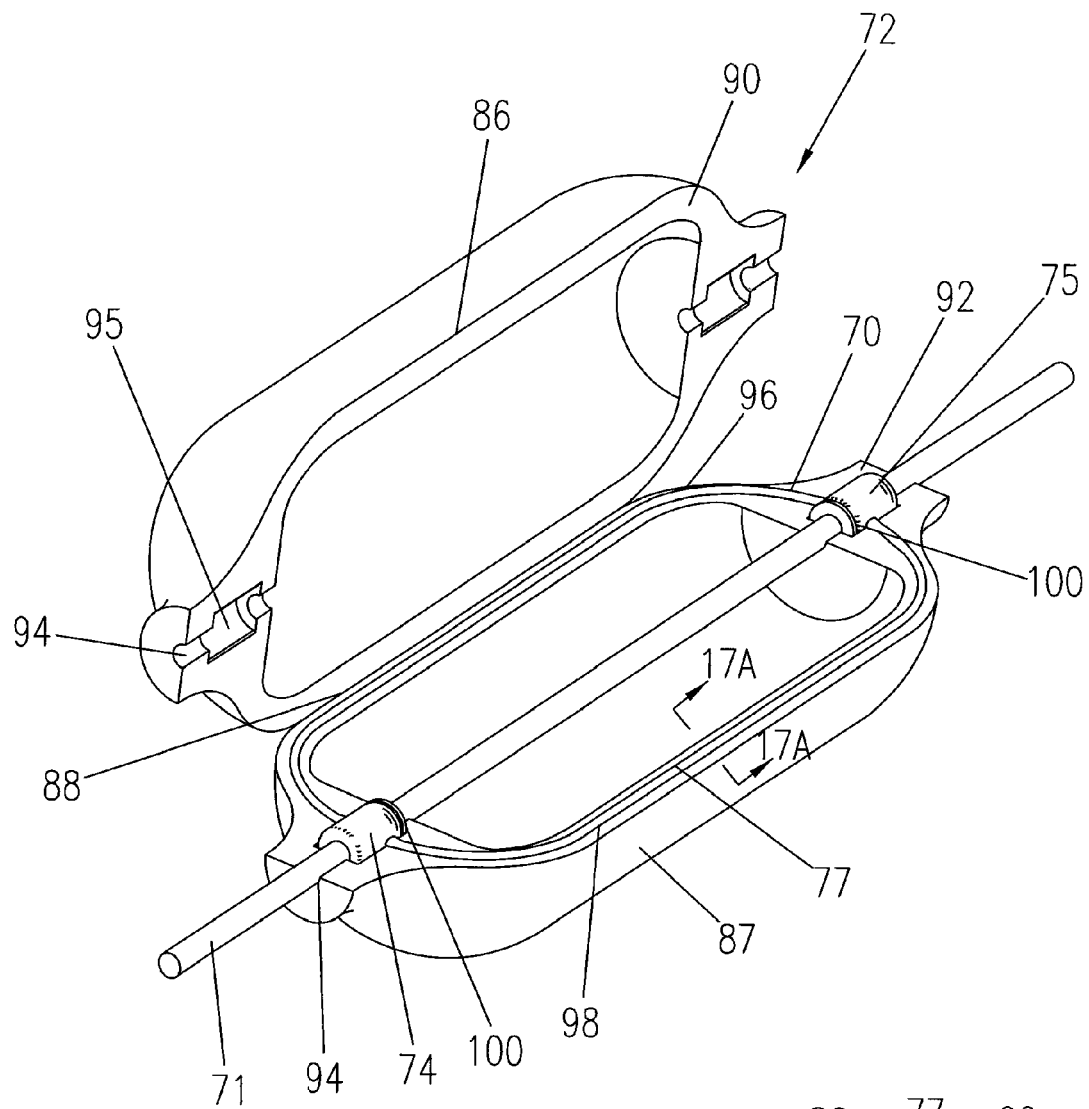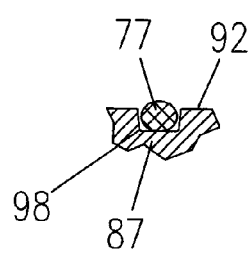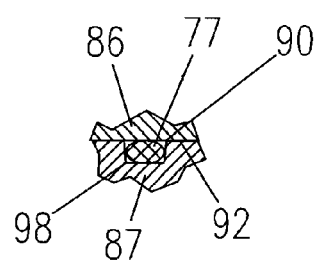
FIGURE 17
FIGURE 17A
FIGURE 17B

CABLE SEAL ASSEMBLY AND METHOD

RELATED APPLICATION

The present application claims the benefit of now abandoned U.S. provisional patent application No. 60/712,094, filed on Aug. 29, 2005, which is incorporated herein by reference in its entirety.

BACKGROUND

1. Field of the Invention

The present invention generally relates to cable seal assemblies and methods for sealing electrical, optical, and hybrid cables.

2. Related Art

The problem of sealing to long, thin objects such as cables when an end is not accessible has not been effectively solved. Because of this, long cables, such as installed cables, often cannot be repaired without cutting them.

Shafts, cables and the like which extend through bores, such as cable ends extending into underwater connector halves or into an equipment housing or junction box, are sometimes sealed by means of an O-ring seal seated in an annular groove on the inner surface of the bore through which the cable extends. Such o-ring seals to cables often fail for the following reasons. O-ring seals have a relatively small axial contact area with the opposing surfaces of the shaft and bore. This area may be insufficient to allow the O-ring to bridge over irregularities on the shaft and bore surfaces, and requires high seating pressures to make sure that the seal is effective. Because of the high seating pressures required, O-rings often cannot be used to effectively seal against the outer jackets of most submarine or subsea cables. Generally, cables such as these have outer jackets and/or cores of polyethylene or similar plastic material. When exposed to the seating pressures of O-ring seals over time, the cable deforms and the seals leak. O-ring seals are primarily intended to be used against rigid, smooth surfaces.

When an external pressure $P_a$ is applied to a properly seated and lubricated O-ring seal, the seal slides in its seat or groove until it meets the wall of the groove on the side opposite to the applied pressure. External pressure $P_a$ exerts an unseating pressure tending to separate the seal from the opposing surfaces of the bore and cable. But the pressure available to hold the seal against these surfaces is equal to the applied pressure $P_a$ plus the pressure $P_c$ exerted against the shaft and bore by squeezing the seal between them, i.e. $P_a+P_c$, and is therefore always greater than the unseating pressure. This means that the seal remains seated regardless of the applied external pressure. At high enough pressures, the energized O-ring deforms into the small crevice between the shaft and bore, and this can eventually cause seal failure.

Unstressed O-ring shaft seals have a round cross-section. Elastic shaft seals of rectangular or square cross-section are also known, such as the so-called Morrison-type seal described in a paper entitled "An Investigation of Cable Seals", by J. B. Morrison, Applied Physics Laboratory, University of Washington, Report #54-41, Mar. 1, 1954. Use of such a seal in a cable sealing arrangement is described in U.S. Pat. Nos. 5,873,750 and 6,067,395 of Cairns et al. This type of seal has a larger contact area with the shaft and cable than a corresponding round cross-section shaft-type seal, but otherwise employs the same physical operating principles. It was assumed by Morrison and others that this type of seal had to have an inner diameter substantially smaller than that of the shaft over which it is installed, and simultaneously a larger outer diameter than the cavity housing it. This resulted in a seal which was often difficult to install or produced disproportionately high squeeze.

SUMMARY

Accordingly, a cable sealing pass-through assembly comprises an outer housing having a through bore, an annular groove in the through bore having opposite end walls and an inner surface, a cable extending through the bore in the housing, and an elastomeric shaft seal seated in the groove between the outer surface of the cable and the opposing inner surface of the groove, the shaft seal having a predetermined axial length and radial thickness, the axial length being greater than the radial thickness, and the seal having a radial cross sectional area in a non-squeezed condition greater than the radial cross sectional area of the cavity defined between the outer surface of the cable and the inner surface of the groove, whereby pressure is elastically induced between the inner and outer surfaces of the seal and the opposing surfaces of the cable and groove. In one embodiment, at least one axially extending slit is provided along the length of the seal between the inner and outer surfaces of the seal. This enables the seal to be installed over a cable even when the ends of the cable are inaccessible.

Due to the size of the shaft (or cable) seal relative to the cavity in which it is seated, the opposite inner and outer surfaces apply an elastically-induced pressure against the opposing surfaces of the groove and cable. At the same time, the opposing surfaces of the slit are pressed together with the same elastically-induced pressure produced by the radial inward and outward squeezing of the seal in the cavity. This means that the slit does not leak even at high external pressures, and the seal with the slit may be as effective as a seal without a slit.

In one embodiment, slit seals may be installed as end seals at opposite ends of a clamshell-like container with a cable extending through the container and end seals and out of the opposite ends of the container. The container and seals can enclose and seal a repaired cable segment or a cable junction, allowing cable repair and installation of cable junctions.

Other features and advantages of the present invention will become more readily apparent to those of ordinary skill in the art after reviewing the following detailed description and accompanying drawings.

BRIEF DESCRIPTION OF THE DRAWINGS

The details of several embodiments of the present invention, both as to structure and operation, may be gleaned in part by study of the accompanying drawings, in which like reference numerals refer to like parts, and in which:

FIG. 17 is a perspective view through part of the cable seal assembly of FIG. 14, illustrating the canister in an open position to reveal the combined cable and face seal device;

FIG. 17A is a partial cross-sectional view through the face seal and groove in the canister face in which the face seal is mounted, with the face seal in a relaxed condition;

FIG. 17B is a view similar to FIG. 17A but with the canister closed and the face seal squeezed between the groove and opposing flat face of the other canister half;

DETAILED DESCRIPTION

Certain embodiments as disclosed herein provide for systems and methods for sealed encapsulation of segments of shafts when the shaft ends are inaccessible. In particular, such shafts could be cables, such as submarine cables, when the ends of the cable are inaccessible. Certain embodiments are particularly concerned with systems and methods for cable repair and for providing a cable access point without severing the cable, and may be used in submarine or harsh environments as well as under normal environmental conditions.

After reading this description, it will become apparent to one skilled in the art how to implement the invention in various alternative embodiments and alternative applications. However, although various embodiments of the present invention will be described herein, it is understood that these embodiments are presented by way of example only and not limitation. As such, this detailed description of various alternative embodiments should not be construed to limit the scope or breadth of the present invention as set forth in the appended claims.

Figure 1:
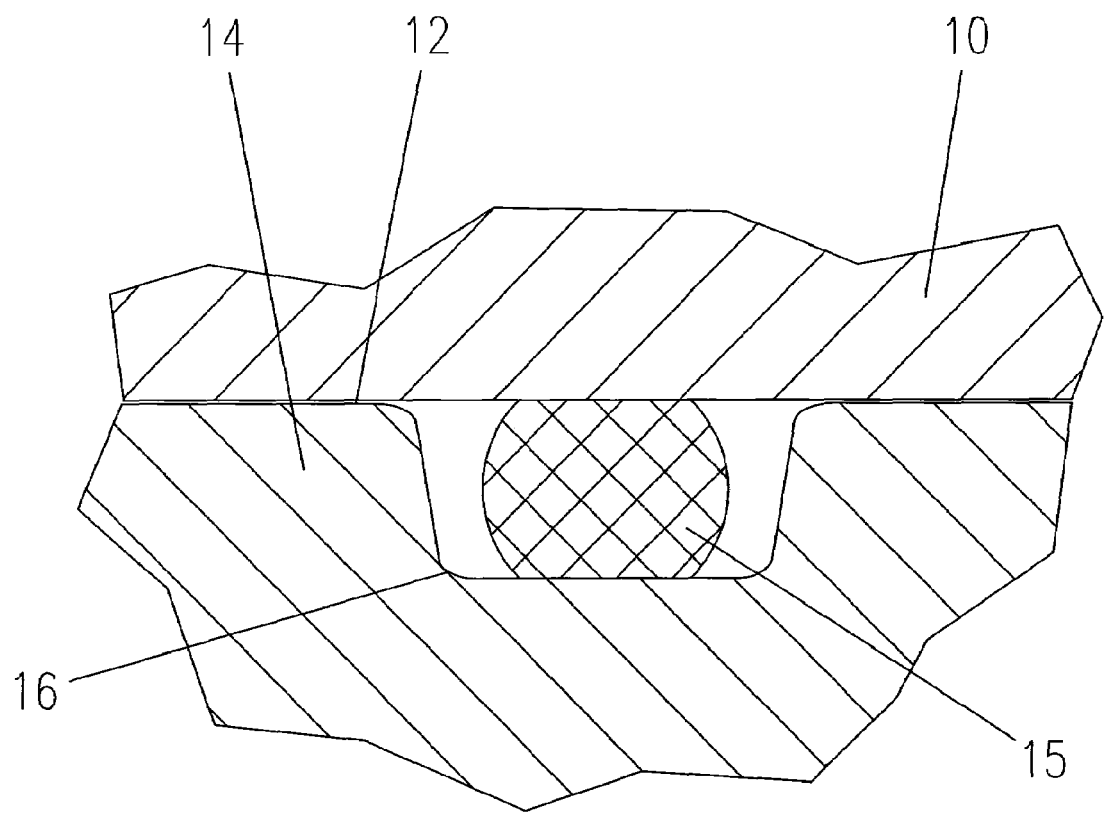
FIG. 1 is a partial cross-sectional view of a prior art O-ring seal assembly.
Figure 2:
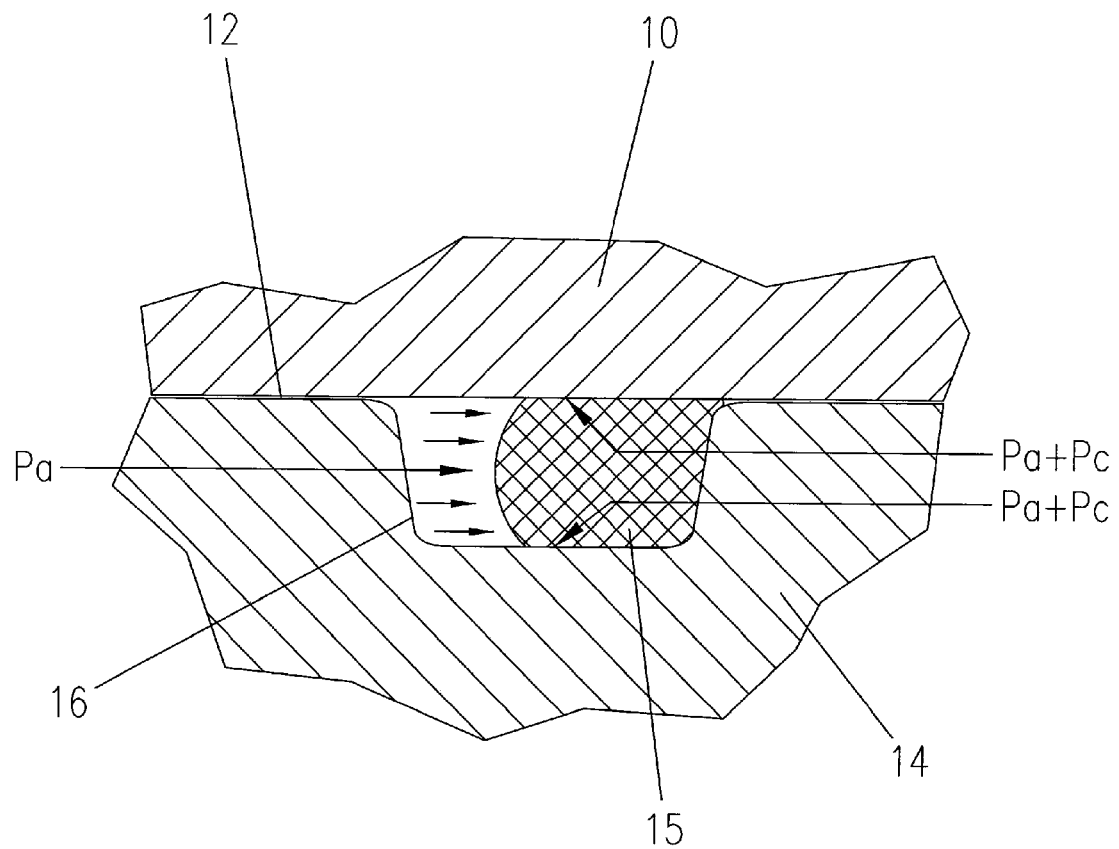
FIG. 2 is a view similar to FIG. 1 illustrating the prior art seal assembly when an external pressure is applied.

FIGS. 1 and 2 illustrate a typical prior art shaft seal assembly for providing a seal between a cable or shaft 10 and a bore 12 in a housing 14 through which the cable extends. An O-ring seal 15 is mounted in an annular seat or groove 16 in the inner surface of the bore, and provides a seal between the outer surface of the shaft 10 and inner surface of the seat 16. The O-ring relies completely on the seating pressures $P_c$ and $P_s$ to create a seal, and its dimensions are such that it is squeezed between the opposing surfaces of the shaft and seat. $P_c$ is the elastically applied pressure exerted against the shaft and bore by squeezing the seal between them. $P_s$ is the pressure created by stretching the O-ring over the shaft, and is typically much less than $P_c$, so it can be ignored for most practical purposes.

In order to provide a seal, the elastically-applied pressure $P_c$ against the shaft and bore surfaces is sufficient to cause the O-ring to conform to, or bridge over, any small irregularities on the shaft and bore surfaces. Since the axial contact between the seal and these surfaces is relatively small, the pressure $P_c$ needs to be correspondingly high to ensure an adequate seal, and is normally greater than 200 PSI. Due to the high seating pressures required, O-ring seals cannot be used on all materials. Some non-reinforced plastics either cold-flow or develop hairline cracks if subjected to localized high pressure for extended periods of time. This can cause the sealing surfaces to deform and the O-ring seal to leak. Because of these limitations, O-ring seals do not seal effectively against the outer jackets of most submarine or underwater cables, which are typically of polyethylene or similar materials. O-ring seals are primarily intended to be used against rigid, smooth surfaces.

Pressure $P_a$ in FIGS. 1 and 2 is the applied environmental or external pressure applied across the seal via the small gap between the outer surface of the shaft and inner surface of the bore. FIG. 1 illustrates the seal when it is not energized, i.e. $P_a=0$. Application of an external pressure to O-ring seal 15 causes it to slide along its seat until it meets the wall of the groove 16 on the side opposite to the applied pressure Pa, as illustrated in FIG. 2. At this point, the seal is energized. At the surfaces where the O-ring conforms to the shaft and bore, there is an un-seating pressure equal to the applied pressure $P_a$. At the same time, the pressure holding the seal against these surfaces is equal to $P_a+P_c$, which always exceeds $P_a$. This additional pressure keeps the O-ring seated regardless of the applied external pressure. This is fundamentally why O-ring seals work.

As the external pressure $P_a$ increases beyond a certain value, the energized O-ring deforms into the small crevice or gap between the shaft and bore, and this extrusion can eventually cause failure. However, O-rings installed in a fixed shaft installation as illustrated in FIGS. 1 and 2 can be used to provide a reliable seal up to pressures as great as 10,000 PSI, provided there is no pressure cycling or shaft movement, and the shaft is not of deformable material.

Cycling and/or shaft movement can cause shredding at the extrusion point and eventual seal failure as a result.

Figure 3:
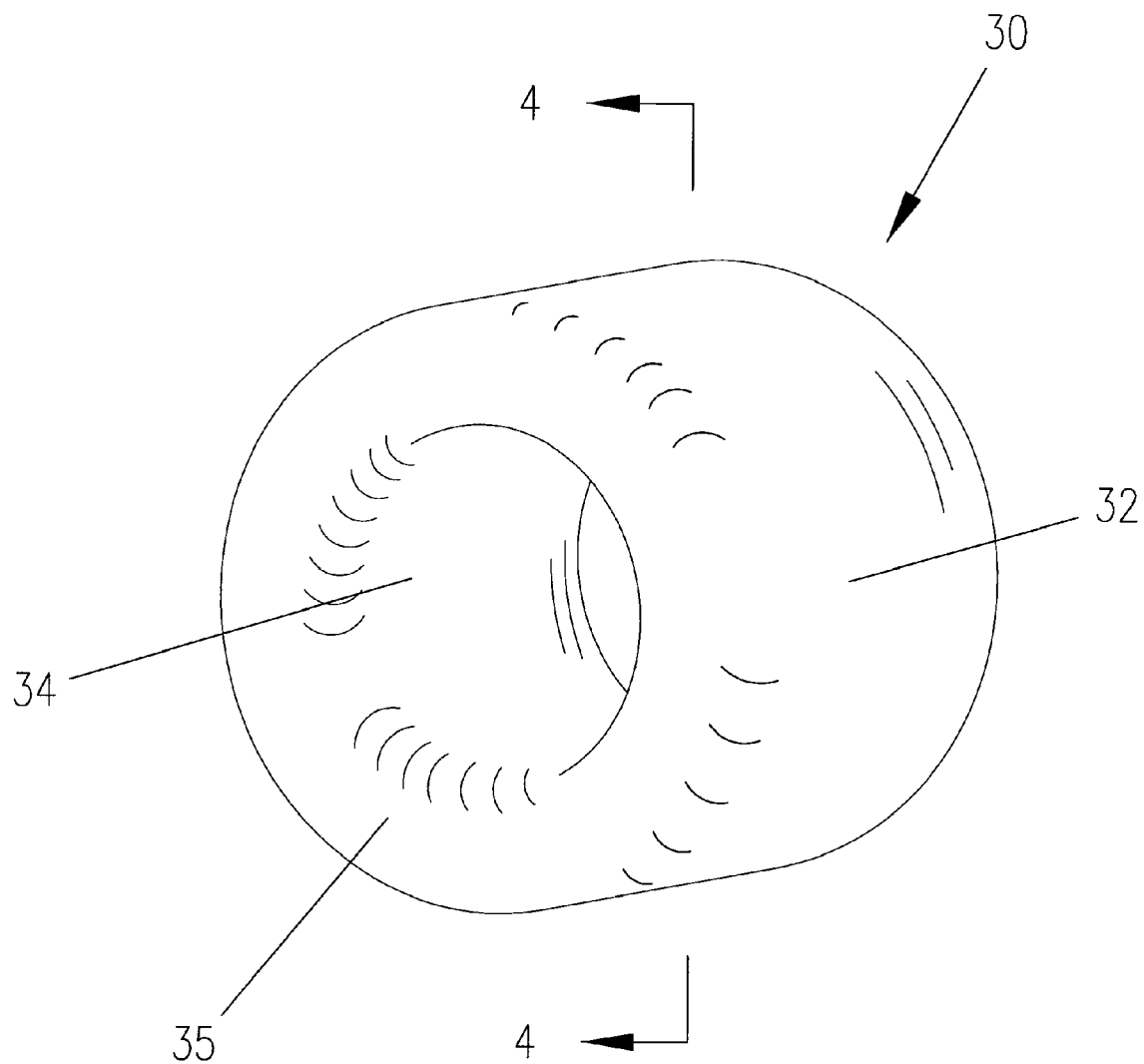
FIG. 3 is a perspective view of a seal according to an embodiment of the invention.
Figure 4:
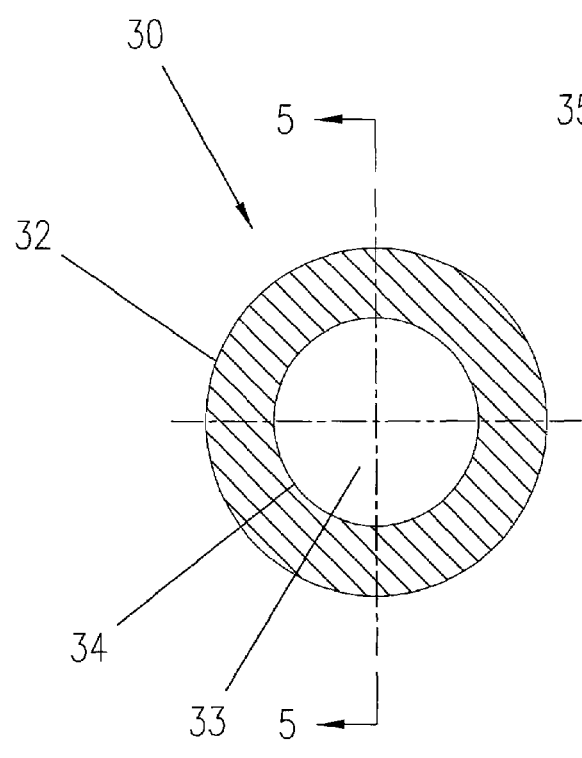
FIG. 4 is a cross-sectional view on the lines 4-4 of the seal of FIG. 3.
Figure 5:
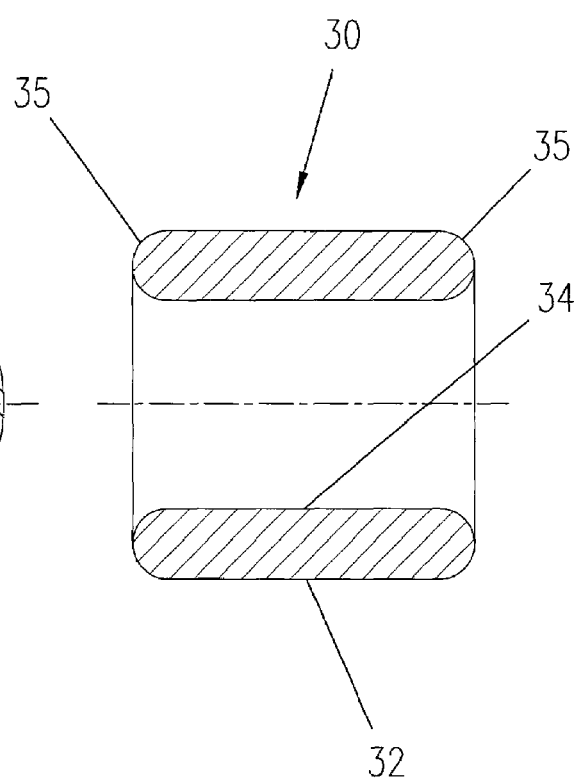
FIG. 5 is a cross-sectional view on the lines 5-5 of FIG. 4

There are many applications for which O-ring seals are not appropriate, for example where the materials to be seated against cannot tolerate localized high pressure, such as the jackets of underwater cables, or where the surfaces are more irregular than O-rings can accommodate. FIGS. 3 to 5 illustrate a band-like shaft seal 30 according to one embodiment of the invention which is more appropriate for such applications. Seal 30 has a similar cross-sectional shape to an elastic band (hence "band-like" seal) and is made of a softer material than a typical O-ring, such as rubber-like, substantially incompressible, elastomeric material. In one embodiment, the seal material is an elastomer with a hardness of the order of 40 to 60 Shore A durometer. The seal body is generally tubular in shape and is elongated in the axial direction with generally flat outer and inner cylindrical faces 32,34, axial through bore 33, and rounded axial ends 35. The axial length L of the seal is greater than the radial width W of the seal, as can be seen in FIG. 5.

Figure 6:
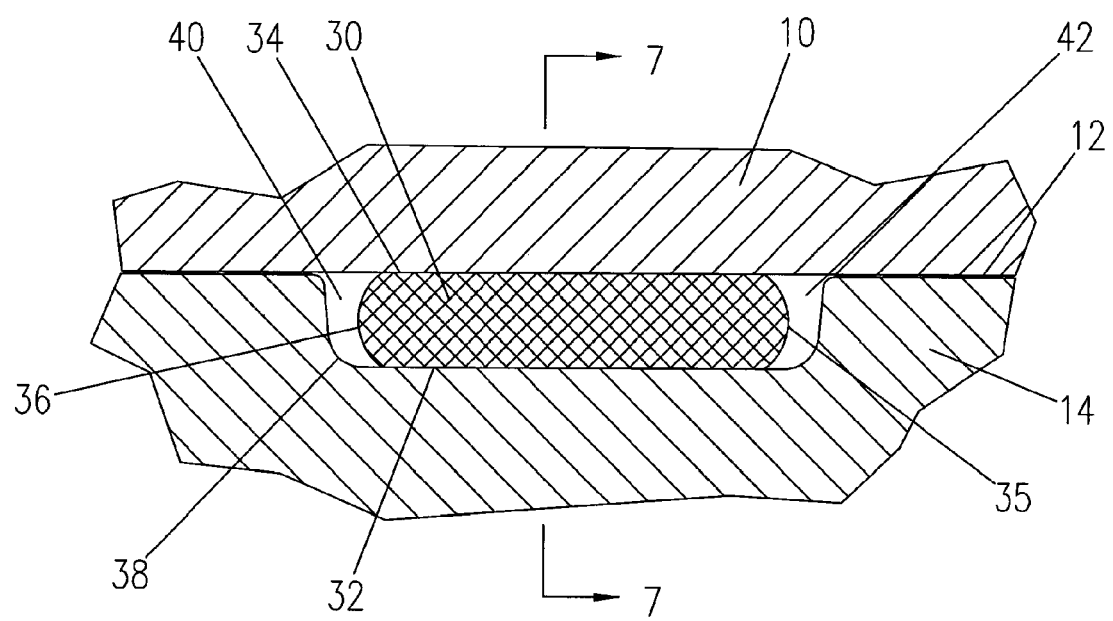
FIG. 6 is a partial cross-sectional view illustrating the seal of FIGS. 3 to 5 used in a cable or shaft seal assembly according to one embodiment of the invention.

FIG. 6 illustrates the seal 30 of FIGS. 3 to 5 seated in annular groove 38 to provide a seal between a shaft 10 and bore 12, in place of the O-ring seal of FIGS. 1 and 2. The annular groove 38 in this case is of appropriate shape and dimensions to accommodate the band-like shaft seal 30.

FIG. 6 illustrates the seal 30 in a non-energized condition in which external pressure is not applied to the seal. Like an O-ring, the band-type seal 30 relies on seating pressures $P_c$ and $P_s$ to create a seal. $P_c$ is the pressure exerted between the shaft 10 and bore 12 by squeezing the elastic seal between them, while $P_s$ is the slight pressure, if any, created by stretching the seal 30 over the shaft 10. It can be seen by comparing FIG. 6 with FIG. 1 that the axial contact area of seal 30 with the opposing sealing surfaces of the shaft and bore is much greater than that of the O-ring seal 15 of FIG. 1. As a result, seal 30 can conform to, or bridge over, much larger or axially longer irregularities than can an O-ring seal. Due to the much more extensive surface contact, seal 30 can be used effectively with much lower seating pressures, reducing the risk of damaging or deforming the sealing surfaces of the shaft or cable and bore against which the seal acts. Typically, the seating pressure $P_c$ of seal 30 may be an order of magnitude lower than that of an O-ring, and is in a range of approximately 20 PSI to 200 PSI.

Seal 30 is similar to a rectangular cross-section seal commonly known as a Morrison-type seal, as described in U.S. Pat. No. 6,067,395 of Cairns et al. and in a paper entitled "An Investigation of Cable Seals", by J. B. Morrison, Applied Physics Laboratory, University of Washington, Report #54-41, Mar. 1, 1954. However, seal 30 in the illustrated embodiments differs from a conventional Morrison-type seal since it has rounded ends 35, 36, rather than flat ends. Rounded seal ends can help support higher external pressures. Seal 30 may have flat ends in alternative embodiments. Seal 30 is under enough radial squeeze to form a seal to the shaft 10 and the opposing surface of the groove 38 in bore 12 prior to being energized. This is achieved by ensuring that the radial cross-sectional thickness of the seal 30 slightly exceeds the radial extent of the cavity in which it resides.

Where seal 30 is used in a cable seal application, the amount of radial squeeze is such that the seal does not cause substantial plastic deformation or harm to the cable itself. A modest pressure may be sufficient to ensure that the inner surface 34 of the seal conforms well to any cable irregularities, so that there is no leakage between the opposing surfaces of the cable and seal. Sealing of cables is a particularly difficult problem, since they are seldom actually round in cross-section, and their diameters can vary along the length of the cable. The outer jackets are also often somewhat soft and compressible. However, the band-like seal arrangement of FIG. 6 can provide an adequate seal for most submarine cables.

Figure 7:
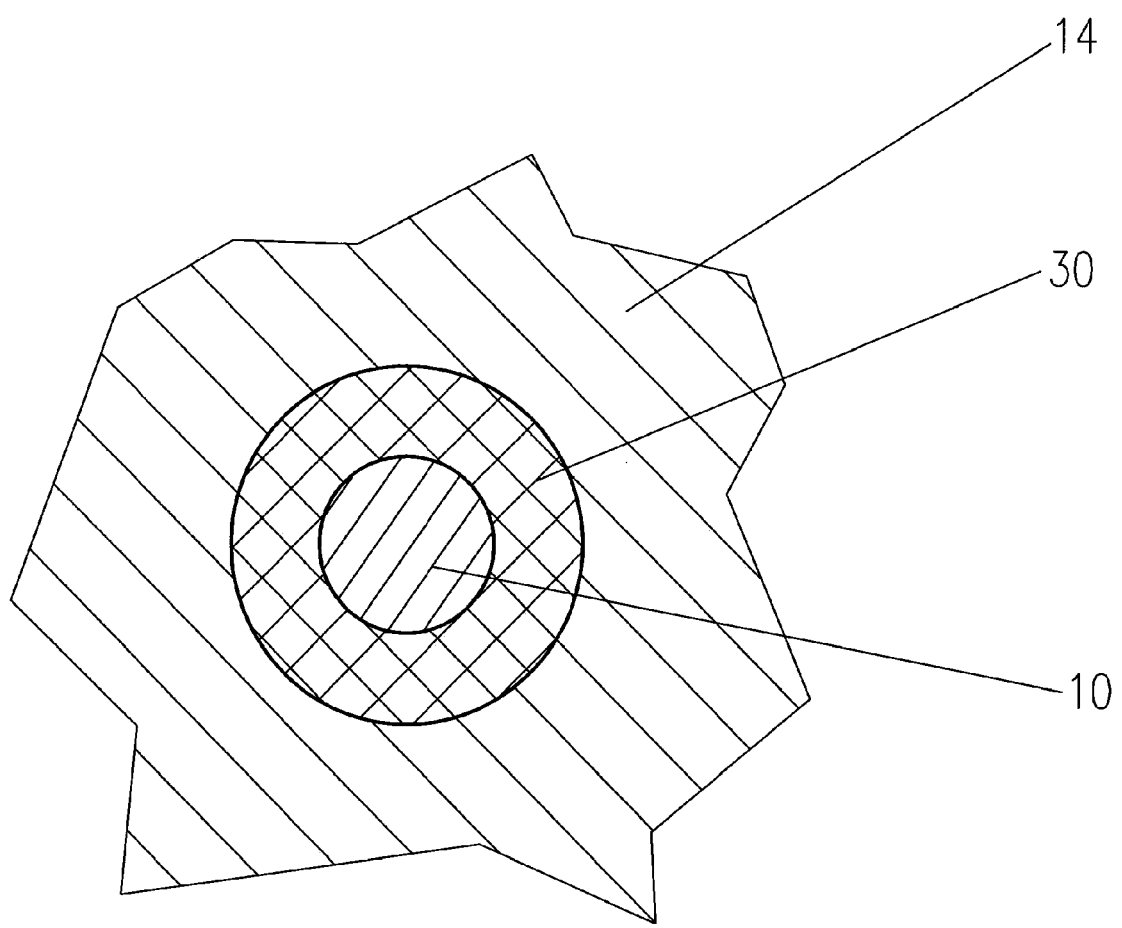
FIG. 7 is a cross-sectional view on the lines 7-7 of FIG. 6.

FIG. 7 is a radial cross-sectional view of the band-type seal 30 in the cable seal arrangement of FIG. 6. The cavity area $A_c$ occupied by the seal when squeezed between the opposing surfaces of the cable and cavity or groove in which the seal is seated is given by:

$$A_c = (\Pi/4)(d_{co}^2 - d_{ca}^2) \qquad \text{Eqn. 1}$$

where $d_{co}$ is the cavity outer diameter and $d_{ca}$ is the cavity inner diameter of FIG. 7. In order for the seal 30 to be under the desired amount of radial squeeze, so that it applies adequate pressure to the opposing sealed surfaces, the cross-sectional area of the relaxed seal $A_s$ is greater than $A_c$, i.e.

$$A_s = (\Pi/4)(d_{so}^2 - d_{si}^2) > A_c \qquad \text{Eqn. 2}$$

where $d_{so}$ is the relaxed seal outer diameter and $d_{si}$ is the unstressed or relaxed seal inner diameter. When $A_s > A_c$ by a sufficient amount, the seal presses firmly enough against the radial outer surface of the cavity or groove in which the seal is seated, and against the opposing cable surface to conform against these opposing surfaces. Since the seal is elastic, the more that $A_s$ exceeds $A_c$, the greater the conformity of the seal to the opposing surfaces.

When designing the dimensions of the seal 30 relative to the cavity or groove in which it is seated, the effects of swelling or shrinkage of the seal due to thermal expansion and contraction and due to chemical effects are considered. When designing seals, materials are chosen which minimize chemical effects, based on the seal application. For example, in an underwater application in which the seal is exposed to seawater, seal material is chosen which has little or no reaction with seawater. The effects of thermal expansion and contraction are also considered. Such thermal effects can be accommodated by adjusting the cavity volume appropriately, based on the coefficient of thermal expansion of the elastomer material used for seal 30.

Another factor in choosing the dimensions of the relaxed seal 30 and the seating groove or cavity 38 is to ensure that there is some axial free space or volume in the cavity when it is occupied by the squeezed seal. Because the seal is squeezed radially within the cavity, the free volume comprises a gap between the seal and one or both ends of the cavity. In FIG. 6, gaps 40,42 remain at both ends of the cavity 38. The gap allows for thermal or chemical expansion of the seal and for manufacturing tolerances. The seal is designed to be able to slide to the cavity's end opposite to the applied external pressure in order to energize. The distance over which the seal can slide should be minimized to avoid seal distortion and possible leakage. The desired size of the gap or gaps therefore determines the axial length of seal 30 and axial length of the cavity or groove in which it is seated.

The parameters of seal 30 which should be selected to provide the desired seal properties for a cable application are:

1. The applied pressure $P_c$ across the seal. This pressure is selected to be a relatively light pressure where the seal is applied over a cable, and may be less than the pressure applied by a typical O-ring seal.
2. The relative dimensions of the seal and the cavity or groove in which it is seated. The seal is of axial length less than the axial length of the cavity, and has a radial cross-sectional thickness in a relaxed state which is greater than the radial cross-section of the cavity or groove.

3. The axial length of the seal. This is long enough relative to the cable diameter to reliably bridge all cable-jacket irregularities.

4. The seal material. This material is selected to be chemically compatible with all elements with which it comes into contact, and is a soft, elastic, and substantially incompressible material.

Figure 8:
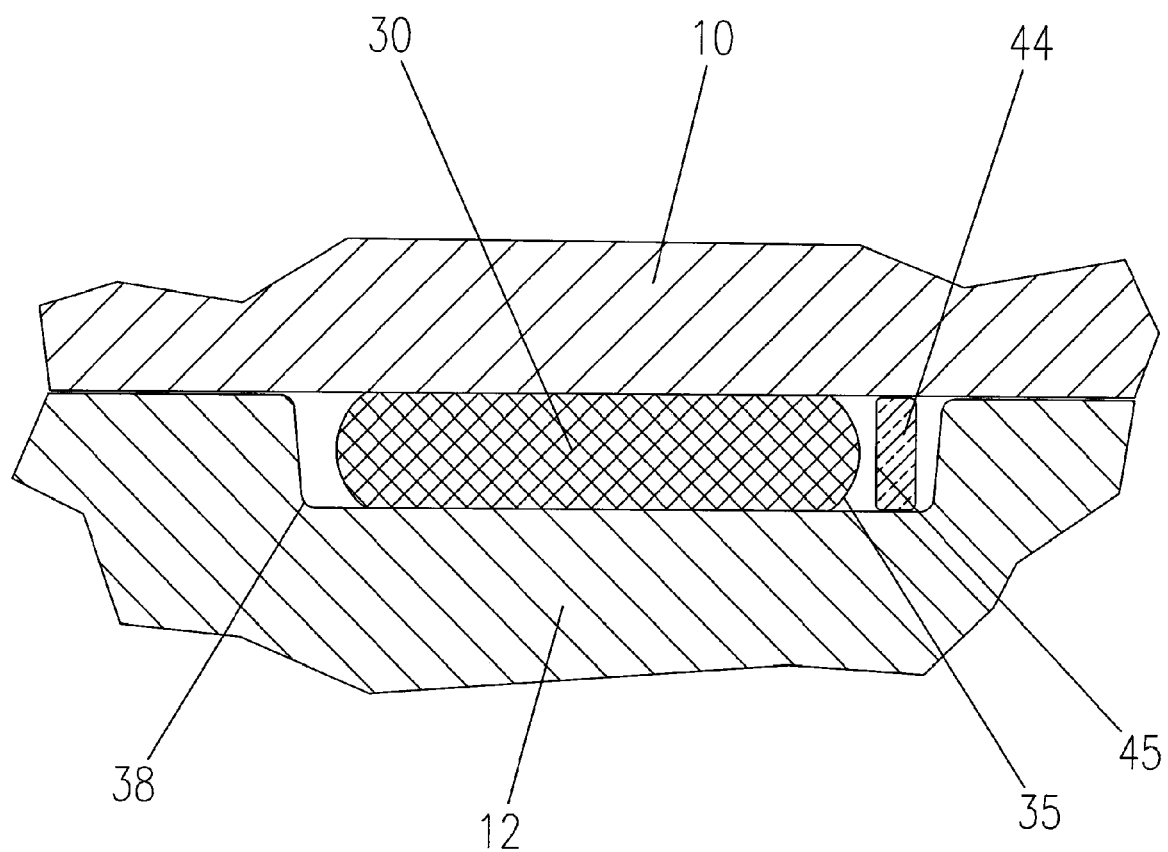
FIG. 8 is a view similar to FIG. 6 illustrating use of a back up ring in the seal assembly of FIG. 6.

In some applications, particularly where the seal 30 is used as a cable seal, a back up ring 44 is used in combination with seal 30, as illustrated in FIG. 8. Back up ring 44 is of a semi-rigid, deformable material such as polyurethane, which is not as soft as the material of seal 30. As seen in FIG. 8, back-up ring 44 is placed on the side of the seal 30 facing away from the applied external pressure $P_a$ although it may alternatively be placed on the opposite side of seal 30. The semi-rigid back up ring 44 can slightly interfere with the jacket of cable 10 and better conform to it than the machined bore 12. It therefore acts as a barrier to prevent extrusion of the material of seal 30 into the gap between the cable and bore 12. When the seal 30 is energized, end face 35 moves into close sealing engagement with the face 45 of the back-up ring.

Figure 9:
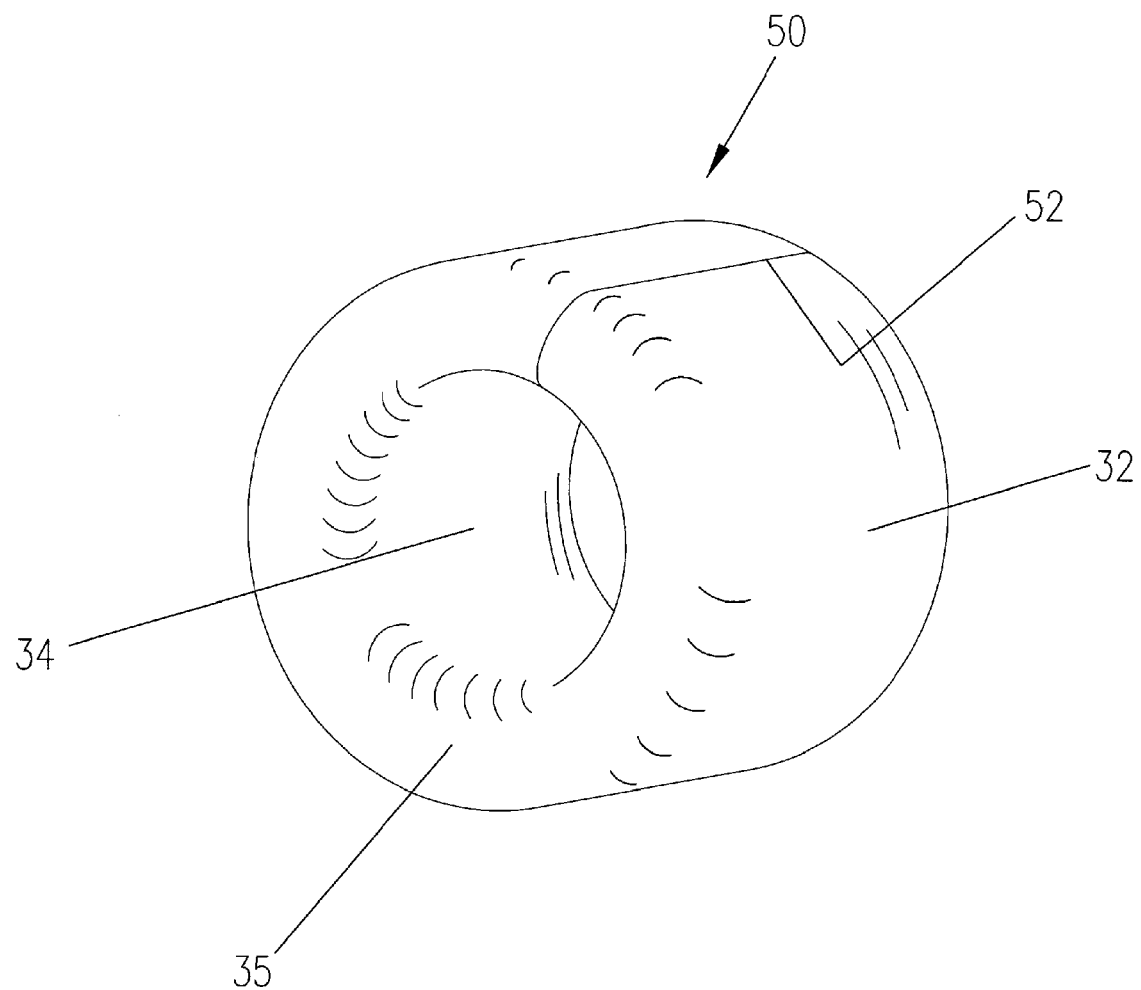
FIG. 9 is a perspective view similar to FIG. 3 illustrating a modified seal having an axial slit.
Figure 10:
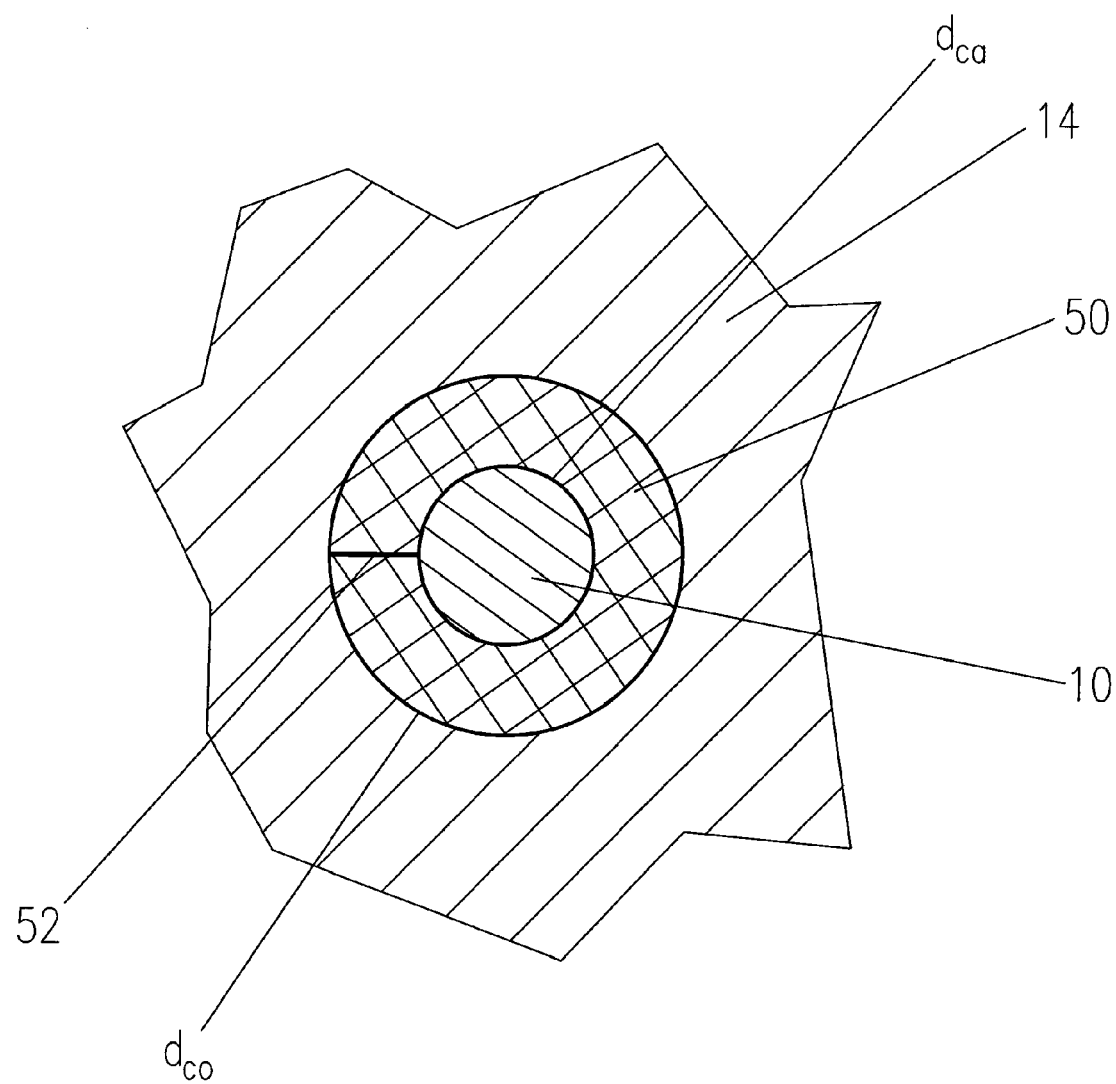
FIG. 10 is a partial cross-sectional view illustrating the seal of FIG. 9 used in a cable or shaft seal assembly according to another embodiment.

The embodiments described above assume that a cable end is accessible for placement of the seal over the cable. If no cable end is available, a continuous tubular band-like seal 30 as illustrated in FIG. 3 cannot be installed. This makes it impractical for repair of long cables, such as submarine cables, for example. FIG. 9 illustrates a modified split tubular seal 50 which is identical to the seal of FIG. 3 except that an axial slit 52 is provided along the entire length of the seal, and like reference numerals have been used as appropriate. The seal 50 is cleanly slit along its length prior to installation. FIG. 10 illustrates the split seal 50 installed in a cavity or annular groove between bore 12 and cable 10. It can be understood that the relative dimensions of the split seal 50 and cavity or groove in the bore in which it is seated are similar to those of FIG. 3 for the un-split seal, and that a back-up ring 44 as in FIG. 8 may also be used in conjunction with split seal 50. Seal 50 may have rounded ends 35 as in the previous embodiment, or may have flat ends. The opposing surfaces of the slit 52 may be flat or may have other matching shapes, such as mating convex and concave shapes.

The split seal 50 of FIGS. 9 and 10 is sized to apply a modest pressure $P_c$ against the opposing shaft and cavity surfaces. The opposing surfaces of the slit 52 are also pressed together with the same elastically induced pressure $P_c$. The slit therefore behaves in the same way as the interfaces between the seal and the opposing surfaces of the cavity and cable when exposed to an applied external pressure $P_a$. Thus, the pressure available to unseat the opposing surfaces of the slit is equal to $P_a$, which is the same as the pressure available to unseat the inner and outer surfaces of the seal from the surfaces against which they are pressed. The pressure holding the opposing surfaces of the slit together is equal to $P_a+P_c$, i.e. greater than the pressure available to separate the opposing surfaces of the seal. The split seal 50 of FIGS. 9 and 10 can therefore be used readily in situations where opposite ends of a cable are not available and the seal is installed transversely over the cable.

Figure 11:
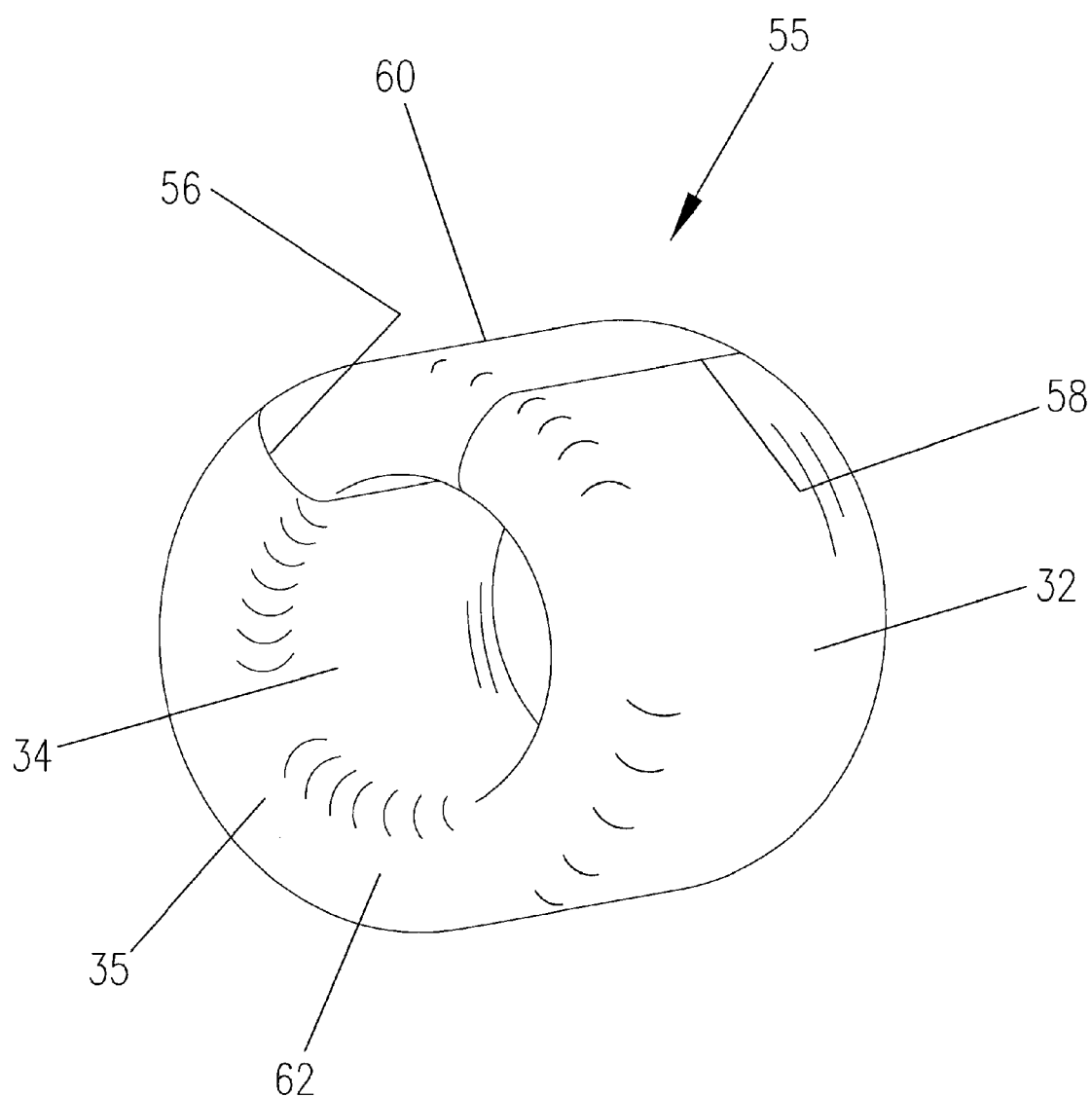
FIG. 11 is a perspective view similar to FIG. 9 illustrating a modified, two part seal with two axial slits.
Figure 12:
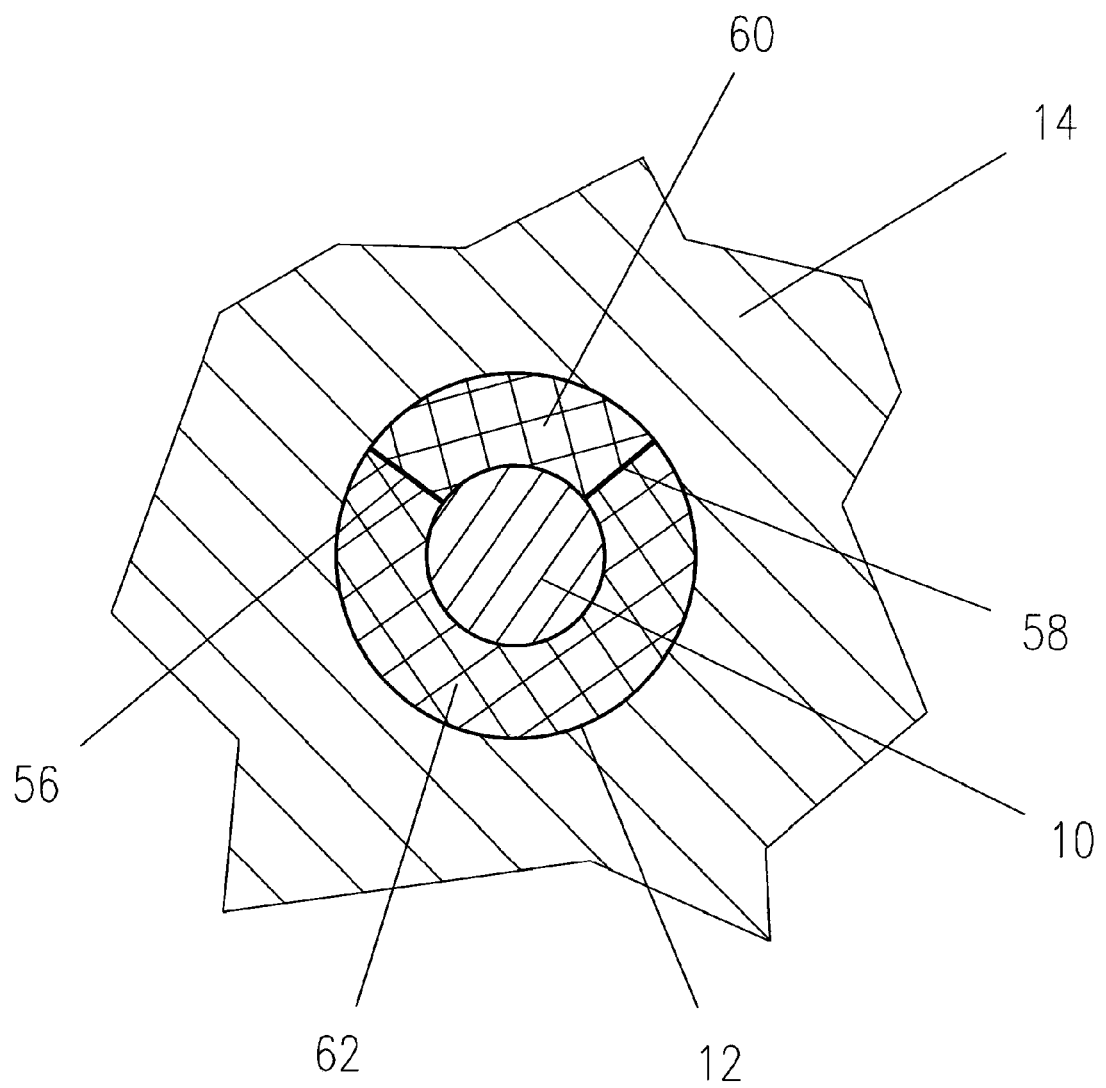
FIG. 12 is a partial cross-sectional view illustrating the seal of FIG. 11 used in a cable or shaft seal assembly according to another embodiment.

FIGS. 11 and 12 illustrate a modified split seal 55 which has two axial or longitudinal slits 56,58, dividing the seal into two separate parts 60,62. Seal 55 is otherwise the same in shape to the seal 30 of FIGS. 3 to 7, and like reference numerals are used as appropriate. FIG. 12 illustrates the double split seal 55 installed in a cavity in a bore 12 and over cable 10. This can enable the seal to be installed more readily around the cable, without having to force opposing surfaces of the single slit 42 of seal 50 of FIG. 9 apart to clear the cable. Again, the opposing surfaces of the two slits 56,58 are each forced together with pressure $P_c$ when the seal is housed in the cavity or groove in bore 12 and over the cable in a non-energized state, and the total pressure forcing each of these opposing surfaces together when an external pressure is applied is $P_a+P_c$.

A split, band-type seal can have one or two longitudinal slits without substantially affecting its operation, with proper selection of the relative dimensions of the seal and the cavity in which it is housed. In each of the split, band-type seal embodiments of FIGS. 9 to 12, the considerations for selecting the relatively soft seal material and relative parameters of the seal and the groove or cavity in which it is seated are the same as those for the non-split seal of FIGS. 3 to 8. In some cases, particularly a cable seal application, back-up rings as illustrated in FIG. 8 are used in conjunction with the split, band-type seal of FIGS. 9 and 10 or FIGS. 11 and 12. The back-up ring can be split in approximately the same way as the band-seal. A back-up ring 44 (FIG. 8) may be split in two places, in the same way as split seal 55 of FIGS. 11 and 12), and the two parts of the back-up ring in this case may be temporarily secured to the seal cavity walls by adhesive or the like to hold it in place prior to installation over the cable.

Figure 13:
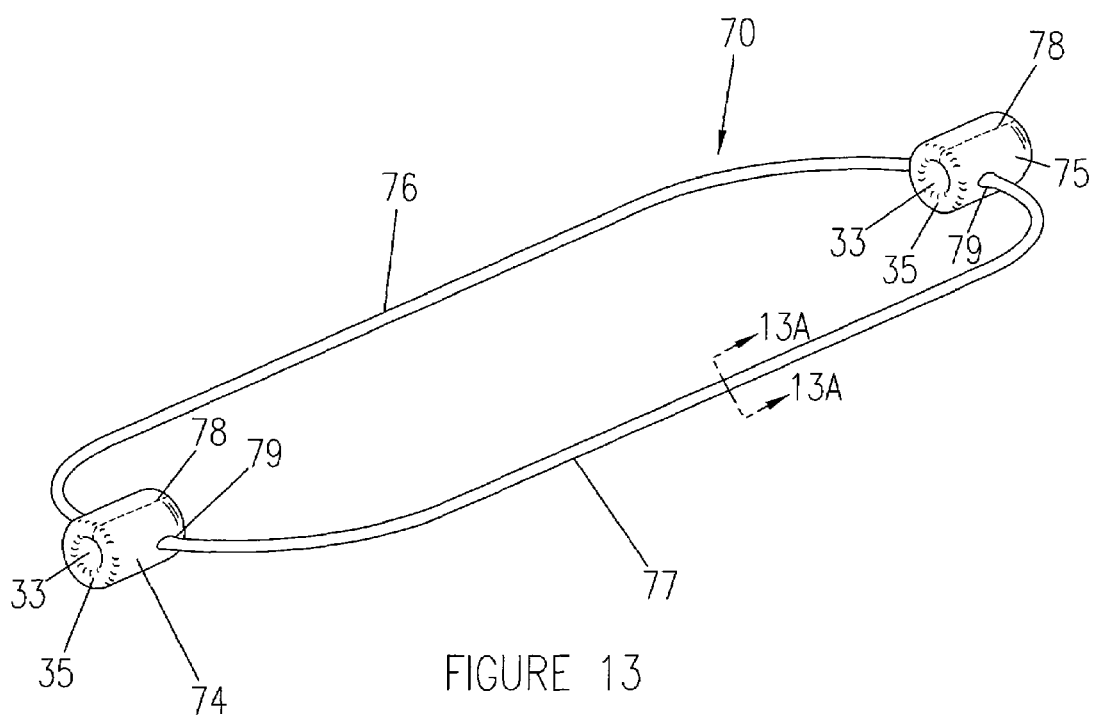
FIG. 13 is a perspective view of a combined cable and face seal device according to another embodiment.

Split seals can allow the sealing of repaired, already installed or long cables, such as underwater or submarine cables, without completely cutting them, as is normally required. One requirement with such seals is a cavity or housing for sealing the desired cable region. One option is to provide a high pressure enclosure which is split in half and installed in a clamshell-like manner over the cables. FIGS. 13 to 17 illustrate one embodiment of a cable seal assembly in which a combination cable seal and face seal device is installed in a split canister or clamshell housing 72. FIG. 13 illustrates the cable seal and face seal device 70, while FIGS. 14 to 17 illustrate the device 70 installed over a cable 71 and between the opposing halves of the split canister or clamshell housing 72.

The combined cable seal and face seal device 70 will first be described. As illustrated in FIG. 13, the cable and end seal device 70 comprises a pair of spaced, tubular or band-like cable seals 74, 75 which are aligned along a longitudinal axis, and a pair of elongate, face-type side runner seals 76, 77 extending between the cable seals or end seals 74,75. The first ends of the face-type seals 76, 77 are secured to opposite locations on the outer surface of the first cable seal 74, while the second ends of the face-type seals 76, 77 are secured to opposite locations on the outer surface of the second cable seal 75. The ends of the face seals 76, 77 may be secured to the cable seals 74, 75 by any suitable means, such as integrally molding the face and cable seals, bonding, adhesives or the like, and the face seals may be shaped at their ends to provide a smooth transition 79 from face seal to cable seal. In one embodiment, for situations where a cable end is available, the cable seals 76, 77 may be similar or identical to the non-split band-type shaft seal 30 of FIGS. 3 to 5, having an axially elongated body of generally annular cross section with a central through bore 33 and an axial length greater than the radial thickness of the seal body, and having generally rounded outer axial ends 35. Alternatively, for situations where a cable is to be repaired without cutting and without access to a cable end, each cable seal 74, 75 may have a single axial slit 78 as illustrated in dotted outline in FIG. 13, similar or identical to the split band-type seal 50 of FIGS. 9 and 10.

Figure 13A:
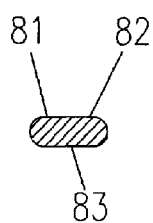
FIGS. 13A and 13B are cross-sectional views illustrating alternative cross-sectional configurations of the face seal portion of the device of FIG. 13.
Figure 13B:
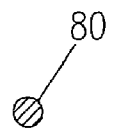
Figure 14:
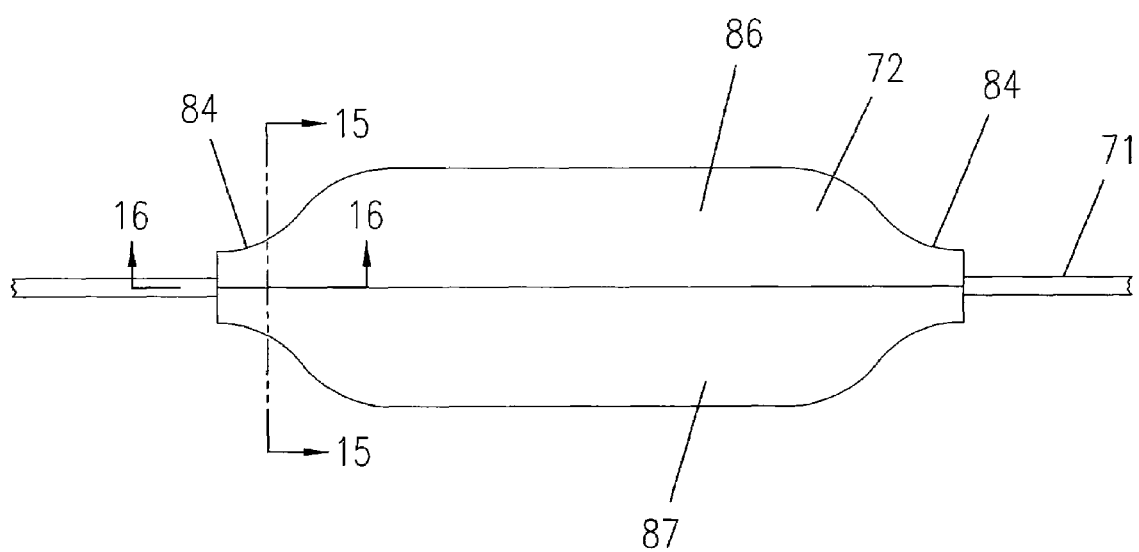
FIG. 14 is a side elevation view of a split canister or pod cable seal assembly in one embodiment, with the split canister in a closed condition, the seal assembly including the combined cable and face seal device of FIG. 13.

Each of the face seals 76, 77 may be of circular cross-section 80 similar to an O-ring, as illustrated in FIG. 13B, or may be of flattened, elongated cross-section 82 as illustrated in FIG. 13A. In the embodiment of FIG. 13A, the face seals each have a transverse width greater than their thickness, and have flattened opposite sealing faces 81, 83 and rounded outer ends. Each face seal has an elongate, relatively straight central portion and bent end portions extending up to the respective cable seal 74, 75, as best seen in FIG. 13.

The combined cable and face seal device of FIG. 13 is integrally formed to allow multiple interfaces or surfaces to be sealed simultaneously. The multiple surfaces may be oriented orthogonally. FIGS. 14 to 17 illustrate one possible use of the seal device 70 of FIG. 13 for simultaneously sealing to a cable 71 and to opposite halves or parts of a clamshell-type, high pressure housing or canister 72 through which the cable extends, so as to seal a damaged or repaired section of cable, for example. The canister is of a suitable rigid material such as metal, rigid plastic, or the like and is shown in a closed condition in FIGS. 14 to 16 and an open condition in FIG. 17. The canister comprises a generally cylindrical housing with reduced diameter opposite end portions 84 each having a through bore 85 (see FIG. 15) communicating with a chamber 89 in the housing and co-axial with the longitudinal central axis of the housing. Housing or canister 72 is split in a plane across the longitudinal axis to form two canister halves 86, 87 (see FIGS. 15 and 17) which are hinged together along a suitable hinge connection 88 along one side of the housing. Although the canister is substantially split in half in the illustrated embodiment, it will be understood that it may be split into two parts of unequal size in alternative embodiments. Any suitable releasable fastener or clamping mechanism (not illustrated) may be used to secure the two halves of the canister together in the closed position. As indicated in the drawings, a cable 71 extends through the chamber 89 and the bores 85 in opposite end portions 84 of the canister.

Although the canister is generally cylindrical and has aligned end bores or ports 85 in the illustrated embodiment, it should be noted that the canister could alternatively be formed in different shapes and may have an elbow or bend such that the end bores or ports 85 are at an angle to one another. Additionally, although the canister has end ports for ingress and egress of the cable in the illustrated embodiment, it may have only one end port or bore in alternative embodiments where the cable terminates in the canister. In this case, the combined cable and face seal device 70 of FIG. 13 will have only one cable or end seal and a single face seal extending from the cable seal around the perimeter of the chamber.

Figure 15:
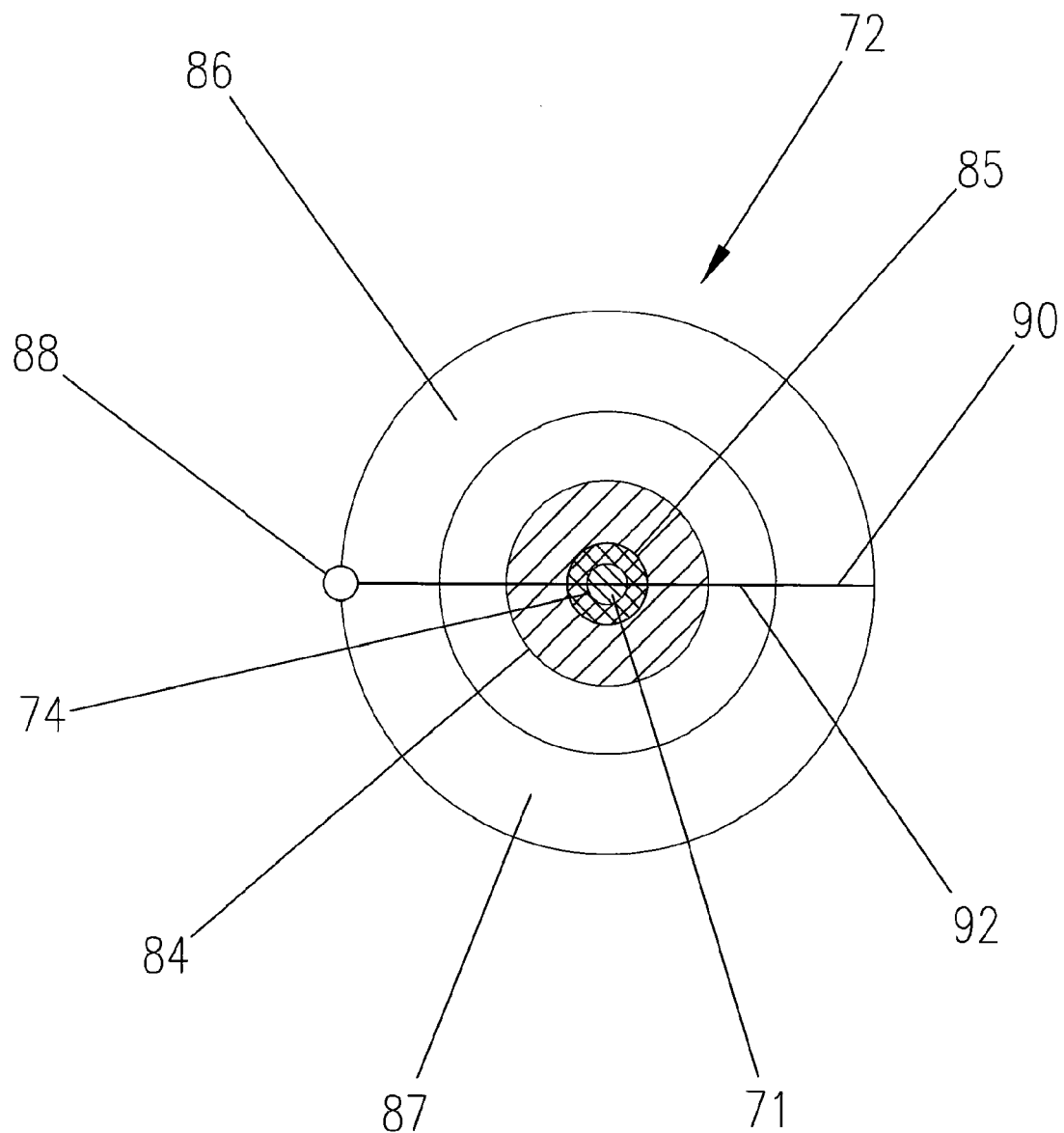
FIG. 15 is a cross-sectional view on the lines 15-15 of FIG. 14, illustrating the mounting of one cable seal of the combined seal device of FIG. 13 between the cable and ends of the split canister.
Figure 16:
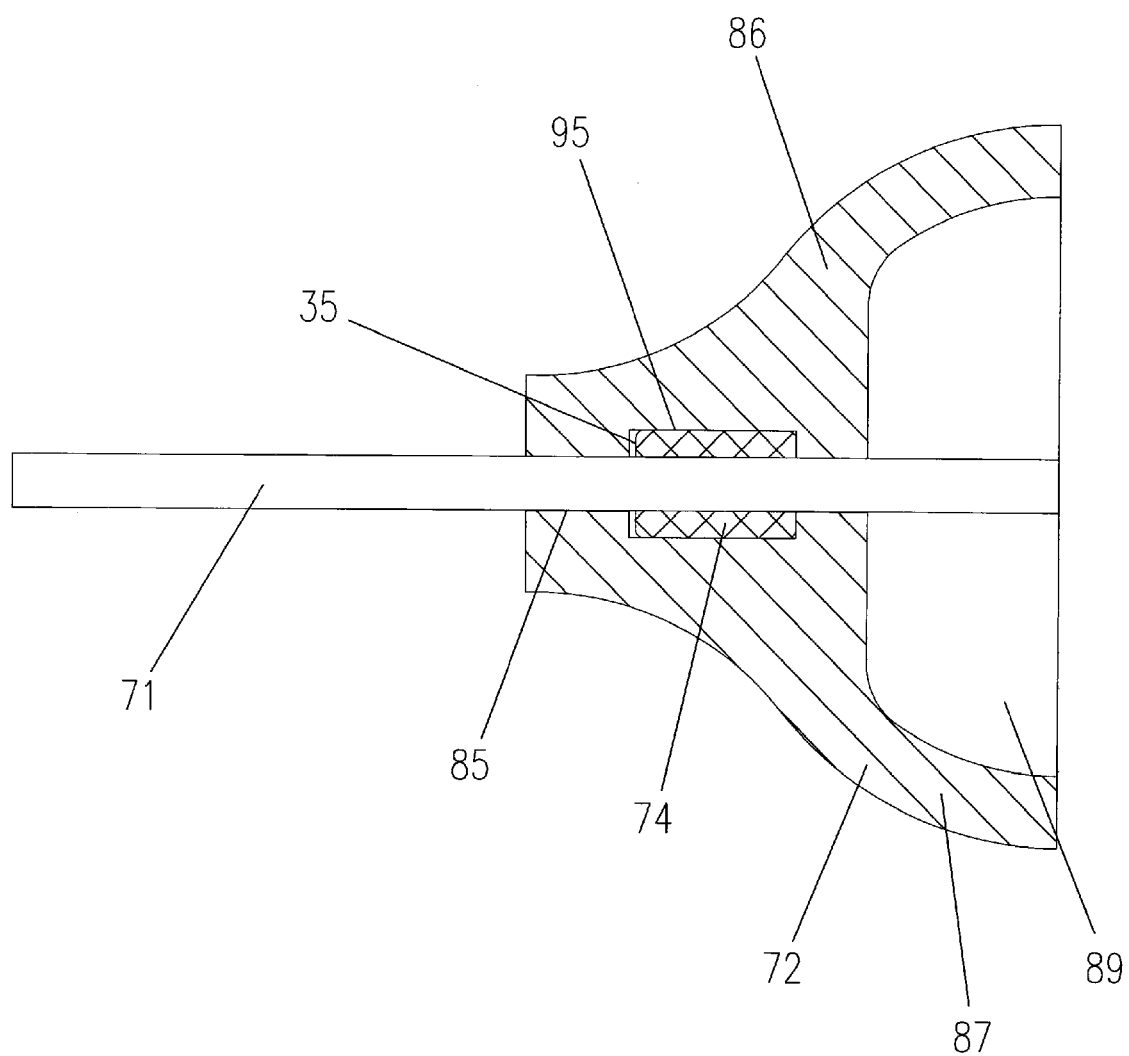
FIG. 16 is a sectional view on the lines 16-16 of FIG. 14.

The combined cable and face seal device 70 may be used for sealing the canister 72 and the cable portion between the bores in opposite end portions of the canister, as illustrated in FIGS. 14 to 17. The two halves of the canister have opposing generally flat faces 90, 92 which are in face-to-face engagement when the canister is closed, as seen in FIG. 15. As best illustrated in FIGS. 15 to 17, each canister half has a semi-cylindrical groove 94 extending across the end portion 84 which is aligned with the other opposing semi-cylindrical groove when the canister is closed to form the through bore 85 into the chamber 89. Each groove 94 has an enlarged semi-cylindrical recess or cavity 95 and the cavities 95 together form a seating cavity for the respective cable seal 74, 75, as illustrated in FIG. 16. The flat face 92 of canister half 86 has a first side-runner groove 96 extending from one side of the half cavity 95 at one end portion and along one side of chamber up to the corresponding side of the half cavity 95 at the opposite end portion of the canister. A second side-runner groove 98 extends between the opposite sides of the half cavities 95 at opposite ends of the chamber 89 and along the opposite side of the chamber. The smooth transition 79 from the side runner or face seals to the respective cable or end seal 74, 75 is also present as a similar smooth transition at the junction between each side runner groove and the end seals. As illustrated in FIG. 17A, the dimensions of the side runner groove 96 and the respective face or side runner seal 77 are selected so that the face seal in a relaxed state projects upwardly out of the groove and above the adjacent flat face 92 of the canister half, and there is a gap between one or both side walls of the groove and the adjacent side face or faces of the face seal. The shape and dimensions of the second side runner groove 98 and seal 76 are substantially the same as illustrated in FIG. 17A.

In order to install seal device 70, the cable seals 74, 75 are engaged over spaced portions of the cable 71 on opposite sides of a repair, splice, or the like in the cable, and seated in the semi-cylindrical recess or cavity 95 in the respective end portions of the canister half 87 with the two face seals 76, 77 seated in the respective side-runner grooves 96, 98, as illustrated in FIG. 17. When the opposing canister half 86 is closed with its flat face 90 engaging the flat face 92 of canister half 87, the end or cable seals 74, 75 are squeezed radially between the opposing surfaces of the cable and the cavity 95, in exactly the same way as described above for the single seal arrangement of FIGS. 4 and 5. At the same time, the face seals 76, 77 are squeezed between the grooves 96,98 and the opposing flat face 90 of the other canister half 86, as illustrated in FIG. 17B, and therefore seal the junction between the two canister halves. The canister halves are clamped together in the closed position by any suitable clamping mechanism.

The seal assembly of FIGS. 13 to 17 provides a seal for all potential leak paths into the closed canister. The potential leak paths to be sealed are the top and bottom of the face seals, the outer circumference of the cable seals, the interface between the cable seals and the cable, and the transition region 79 between each cable seal and the two face seals or side runner seals. These leak paths can be sealed by proper sizing of the cooperating seal and cavities to ensure that a sufficient sealing pressure is applied on closing the canister between each seal region and the opposing faces of the canister halves or canister halves and cable, in the manner described above in connection with FIGS. 3 to 5.

Figure 18:
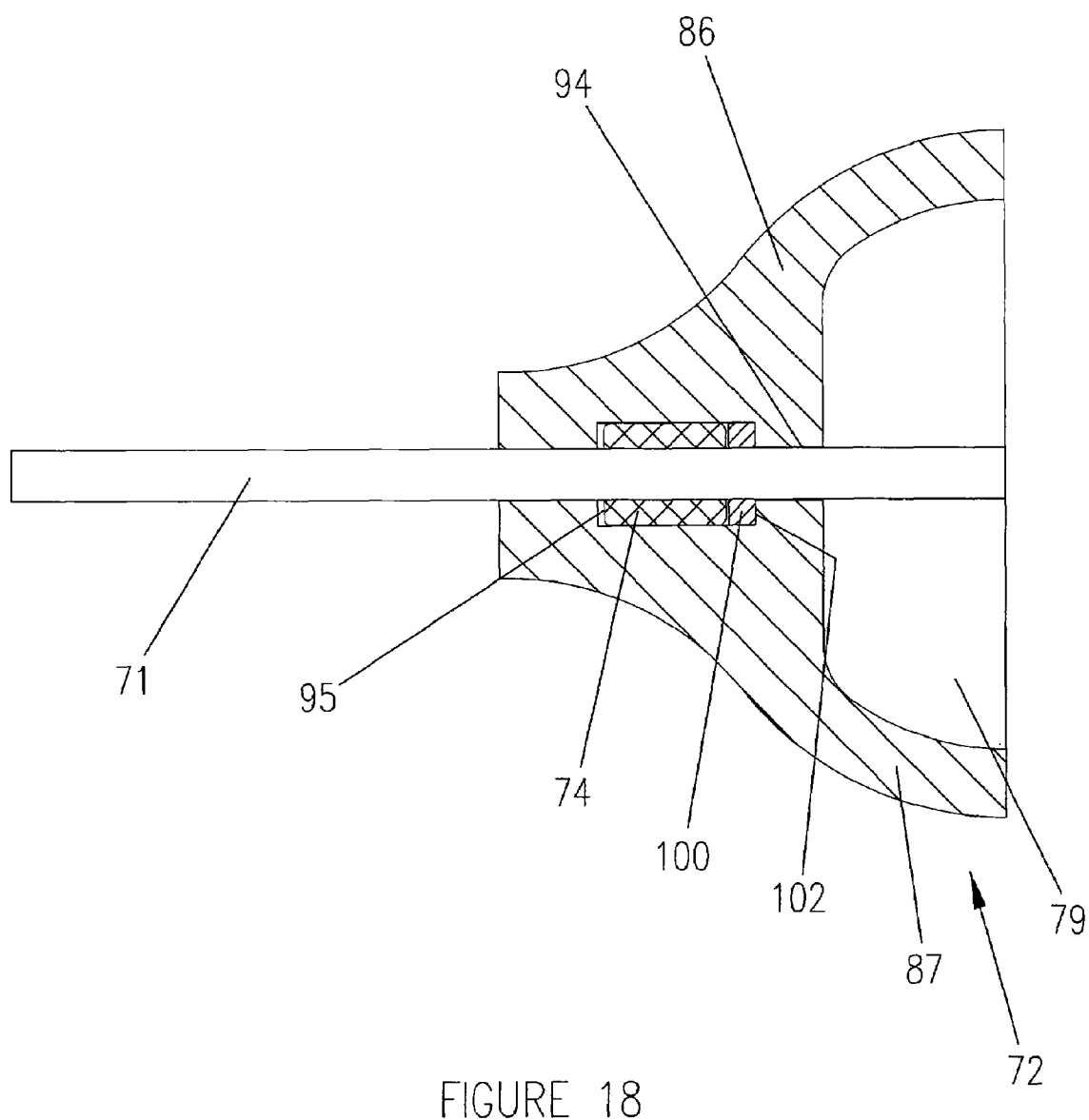
FIG. 18 is a view similar to FIG. 16 illustrating an optional back-up ring.
Figures 19, 20:
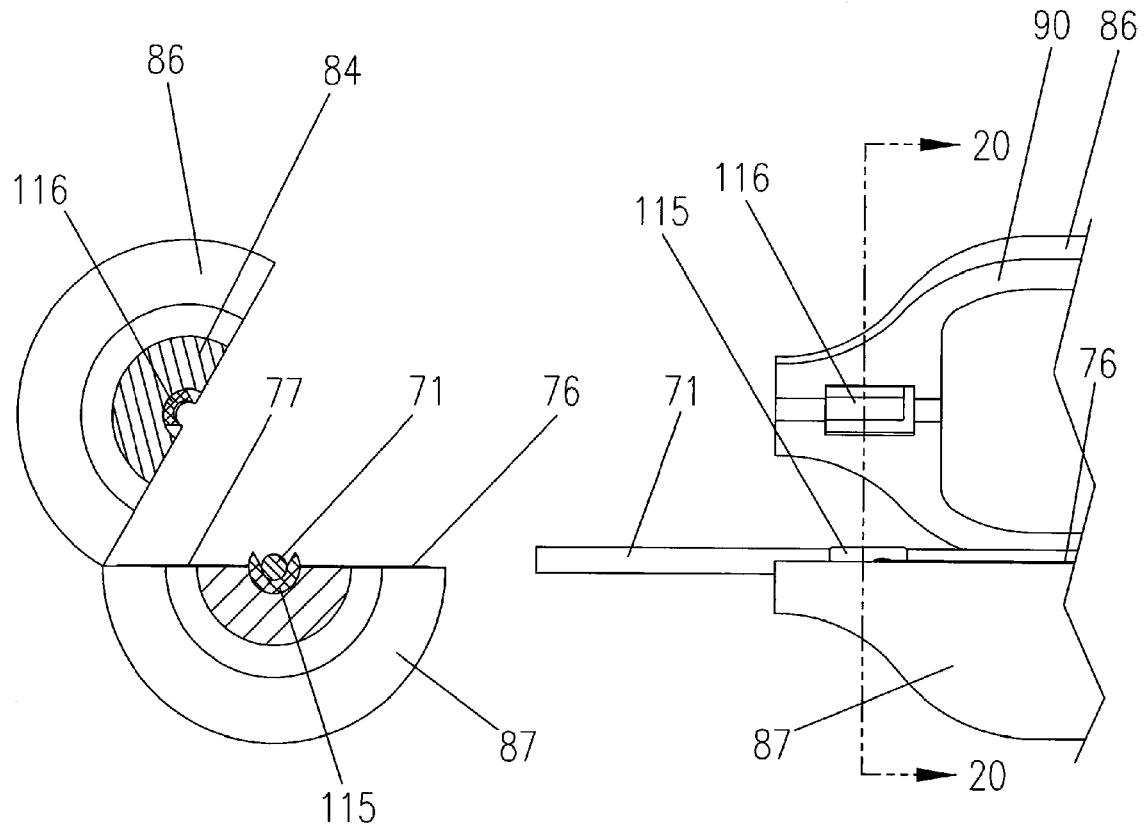
FIG. 19 is a side elevation view of one end of a modified split canister cable seal assembly in the open position.
FIG. 20 is a cross-sectional view on the lines 20-20 of FIG. 19.

A back-up ring 100 may be provided in each cavity 95 between the respective cable seal 74,75 and inboard end wall 102 of the cavity, as illustrated in FIG. 18 for cable seal 74. As in the embodiment of FIG. 8, semi-rigid back-up ring 100 can slightly interfere with the jacket of cable 71 and better conform to it than the machined bore 94. It therefore acts as a barrier to prevent extrusion of the material of seal 74 or 75 into the gap between the cable 71 and bore 94. When the seals 74 and 75 are energized by the high pressure environment surrounding canister 72, the seals move into close sealing engagement with the respective back-up rings 100. The cable seal assembly of FIGS. 13 to 17 allows splicing or repair of long cables such as harsh environment or submarine cables without cutting them, and can allow submarine or harsh environment cable repair either after cable retrieval or in-situ.

In the embodiment of FIGS. 14 to 18, adequate means to grip and support the cable may be provided outboard of the canister ends 84. The band-like cable seals 74,75 of the combined cable and face seal device 70 of FIGS. 13 to 18 are not split. However, as noted above in connection with FIG. 13, a single slit 78 or more than one slit may be provided without affecting the integrity of the seal, for the same reasons as described above in connection with FIGS. 9 to 12. A similar slit or slits are provided in the back-up rings 100, if used. This allows the split canister cable seal assembly of FIGS. 14 to 18 to be used when the ends of cable 71 are not accessible.

Figure 21:
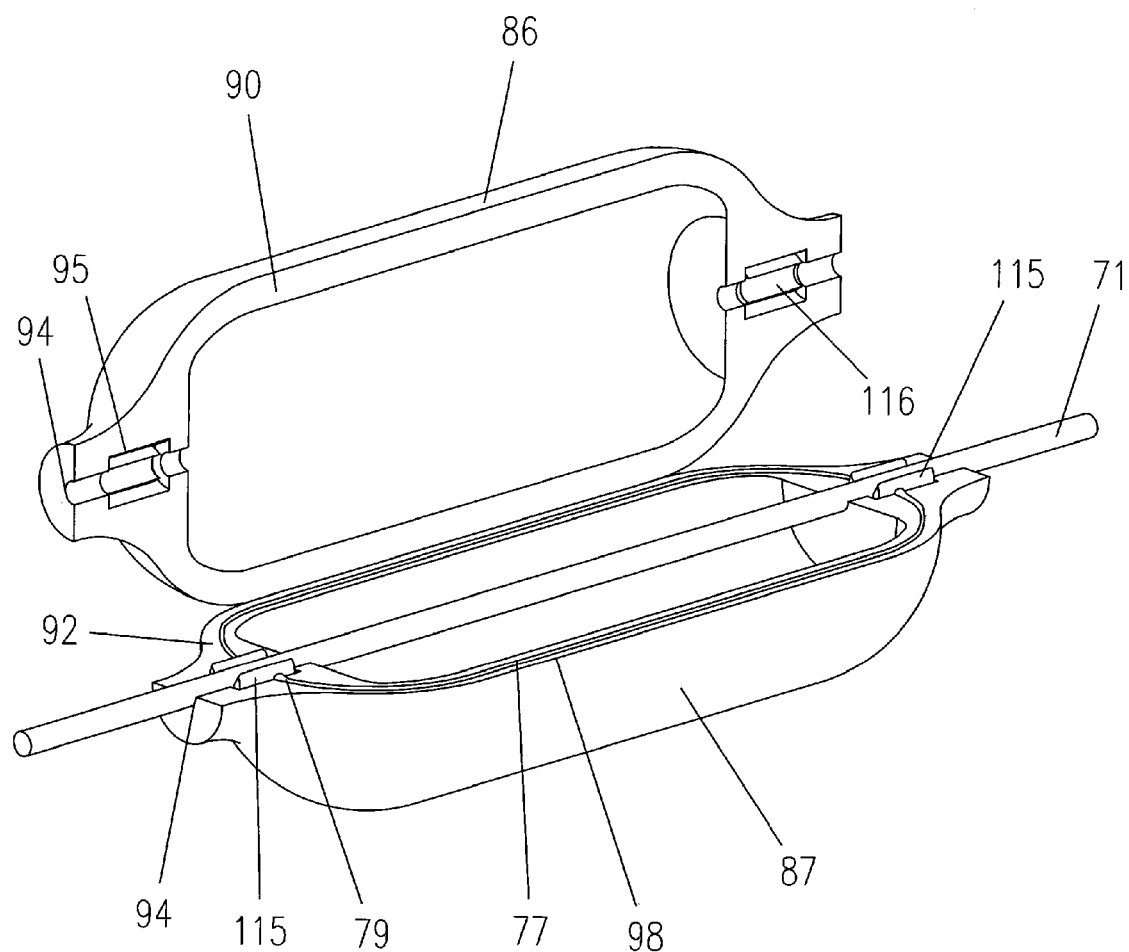
FIG. 21 is a perspective view of the canister cable seal assembly of FIGS. 19 and 20 in the open position.
Figure 22:
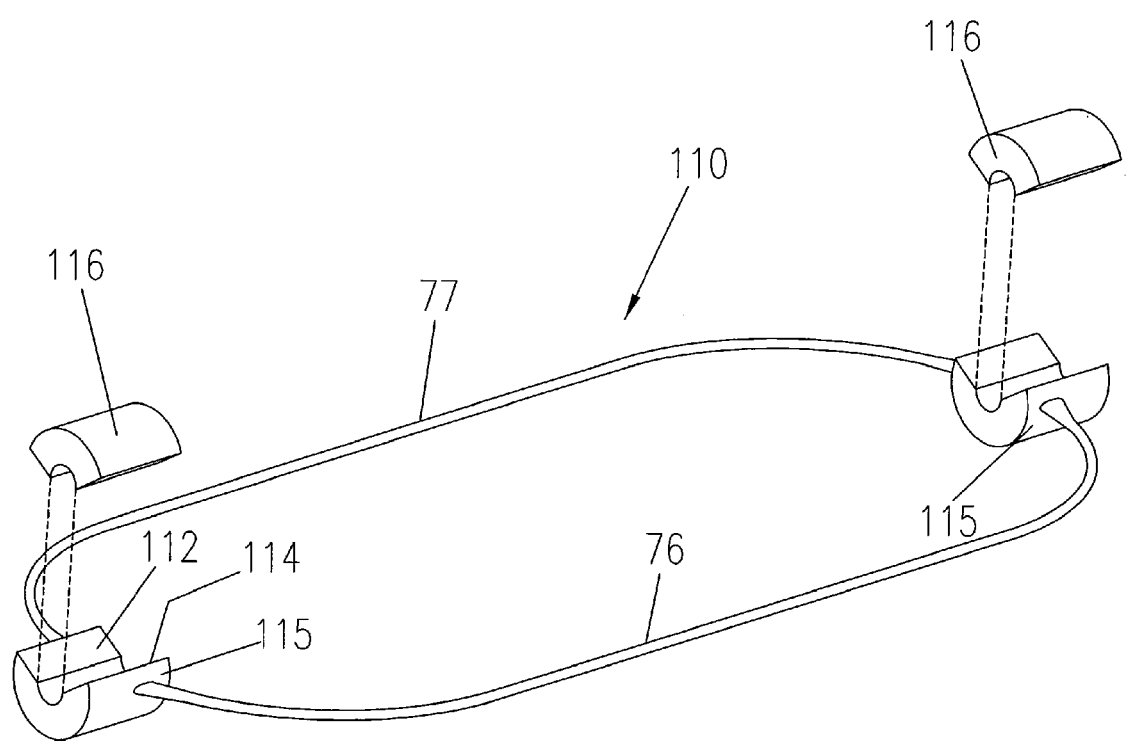
FIG. 22 is a perspective view of the combined end seal and face seal device of FIGS. 19 to 21 separated from the split canister and cable.

In the modified split canister cable seal assembly of FIGS. 19 to 22, the split canister 72 is identical to the previous embodiment, and like reference numerals are used for like parts of the canister, but the combined cable and face seal device 110 is modified, as best illustrated in FIG. 22. Device 110 has cable seals similar to the cable seals 74, 75 of FIG. 13, except that two spaced axially extending slits 112, 114 are provided in each cable seal, similar to the split seal 55 of FIGS. 11 and 12, separating each cable seal into two separate parts 115, 116. The combined or integrated cable and face seal device 110 of FIGS. 19 to 22 is otherwise identical to that of the previous embodiment, and like reference numerals are used for like parts as appropriate. FIG. 22 illustrates the combined cable and face seal device 110 separate from the split pod or canister 72. The side runner or face seals 76, 77 are similar to the previous embodiment and extend between opposite locations on the outer surface of the larger part 115 of each cable seal. Face seals 76, 77 may be of elongated or round cross-section. It is understood that the shape, dimensions and material of the combined cable and face seal device 110 and the corresponding dimensions of the cavities in the canister 72 in which it is contained are arranged in the same way as the previous embodiment such that an effective seal is provided when the canister is closed about the seal device. As in the previous embodiment, a back-up ring 100 may be provided in each cavity 95 between the cable seal and inner end wall 102 of the cavity, and in this case the back-up ring may be slit in two places, similar to the cable seal, to provide two separate back-up ring parts.

On assembly, the first part 115 of each cable seal (and the corresponding parts of the back-up rings, if used) are installed in the cavities 95 in the lower part 87 of canister 72 with the face seals 77, 78 engaging in the corresponding side-runner grooves 96,98 in the flat face 92 of canister half 87. The wedge-like parts 116 that complete the cable seals are housed in the cavities 95 in the upper canister half 86, along with corresponding parts of the back-up ring, if used. These parts may be retained in place prior to closing the canister by any suitable means, such as temporary adhesive. A portion of cable 71 to be sealed may be cleaned and then cradled in the bottom canister half 87 so as to extend between the opposite end portions of the canister half 87, and is seated in the lower seal parts 115 and lower semi-cylindrical grooves 85, as illustrated in FIG. 21. The canister may then be closed and clamped so that the seals are complete and the canister is sealed. Thereafter, the canister may optionally be purged with non-electrically conductive fluid, gas, or the like, or set to atmospheric pressure. Fill and purge ports into chamber 89 may be provided for this purpose. An advantage of having separate seal parts retained in each canister half prior to cable installation is that it facilitates normal cable installation. In an underwater or harsh environment, such a canister could be installed subsea or in the harsh environment, for example by divers or remotely operated vehicles. This would not be possible without split cable seals.

In the embodiments of FIGS. 13 to 22, a combined cable and face seal device is used to seal multiple surfaces, specifically the ends of the canister and opposing surfaces of the cable, as well as the interface between opposite halves of the canister. As noted above, the side runner seals 76, 77 of this device may be O-rings, in which case the limitations described above in connection with FIGS. 1 and 2 apply. However, O-ring side runner seals may be suitable for some canister seal applications. In the alternative embodiments in which the side runner seals are band-like face seals 82 which are radially elongated and of softer material than a typical O-ring, a more effective seal may be provided in some cases. The advantage of using band-like face seals in contaminated environments is that they can bridge across foreign objects such as sand grains or silt particles which may cause a narrower O-ring to leak. Band-like face seals are more forgiving than O-rings but equally effective in sealing. Back-up rings are not generally required for band-like face seals, as the sealed faces are pressed hard against one another, leaving no appreciable gap between them.

The split canister cable seal assemblies of FIGS. 13 to 22 can be used to sealably encapsulate segments of long submarine cables, in the event of repair or the like. The combined shaft or cable and face seal device forms a single, continuous elastomeric seal of all potential leak paths into or out of the enclosure formed by the closed canister.

Figure 23:
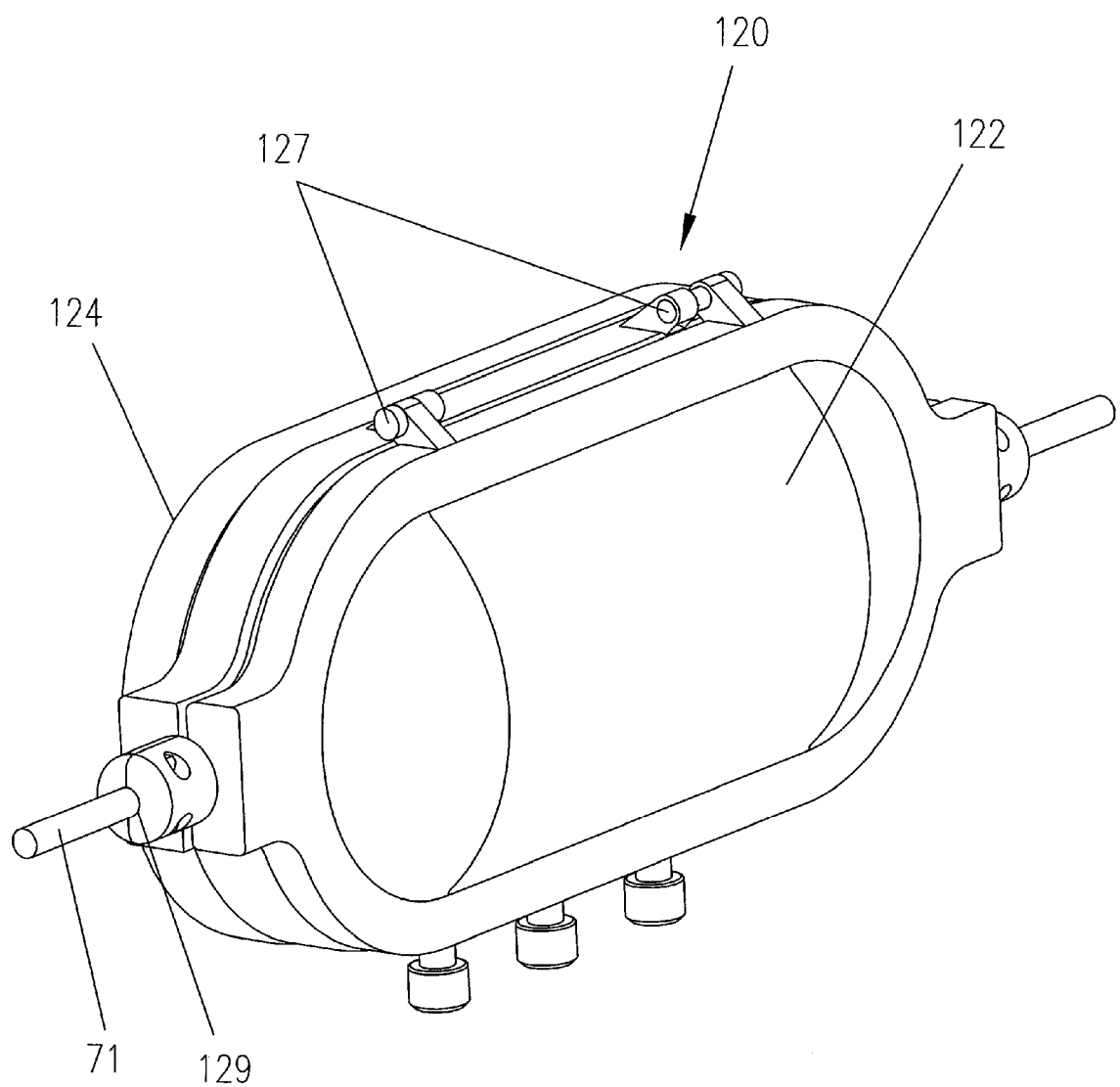
FIG. 23 is a perspective view of a field-installable cable access assembly according to an embodiment of the invention.
Figure 24:
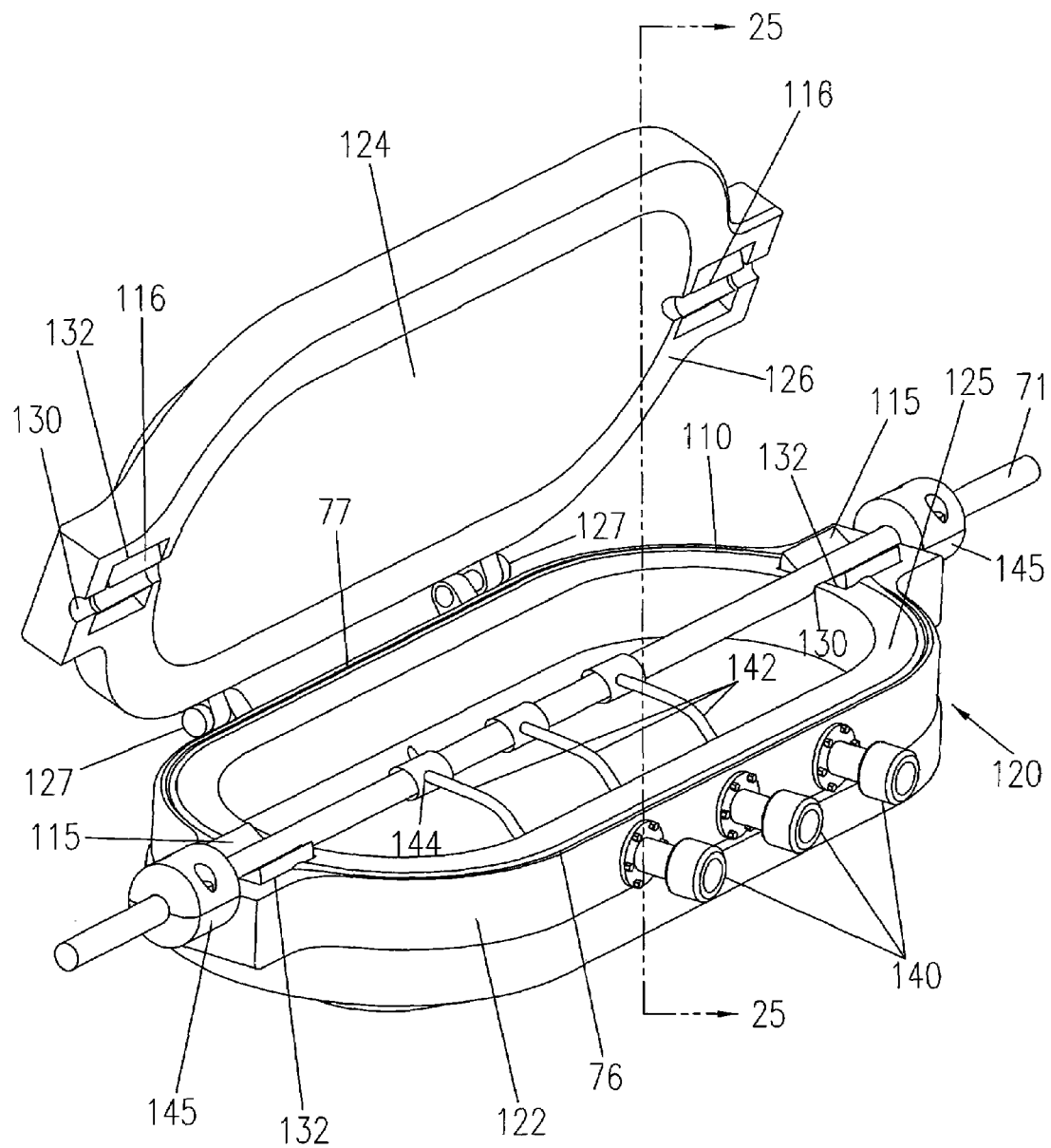
FIG. 24 is a perspective view similar to FIG. 23, illustrating the assembly in an open position.
Figure 25:
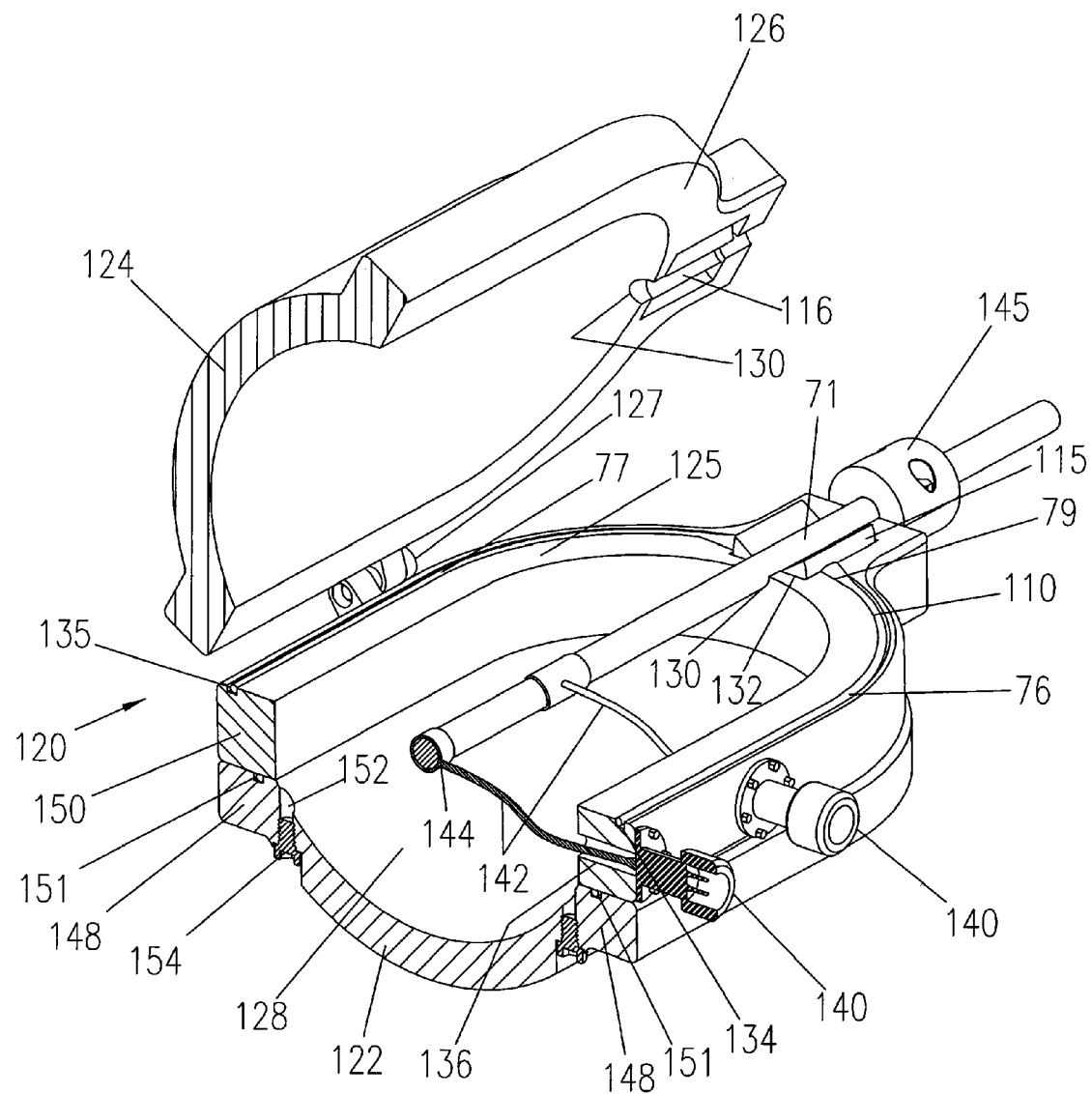
FIG. 25 is a schematic cross-sectional view on the lines 25-25 of FIG. 24, illustrating one of the connectors allowing cable access.

In a modified embodiment, as illustrated in FIGS. 23 to 25, a field installable distribution box or pod 120 for subsea cable segments is provided. This embodiment illustrates construction of a field-installable, connectorized cable access point without severing the cable. Pod or distribution box 120 comprises a split, clamshell-like enclosure having a first part 122 and a second part 124 which are split along an equatorial plane to provide opposing flat faces 125, 126 and which are hinged together by hinges 127 along one side of the enclosure. The enclosure defines an internal chamber 128 with inlets or bores 129 defined between faces 125, 126 at opposite ends of the chamber for passage of a cable 71 through the chamber.

As seen in FIGS. 24 and 25, each flat face 125, 126 has a semi-cylindrical groove or recess 130 with an enlarged cavity 132 at each end of chamber 126 to extend across the respective flat face 125,126 out to the respective outer end of the enclosure. As in the previous two embodiments, these semi-cylindrical grooves 130 and cavities 132 together form the through bore 128 and seal seating recess at each end of the enclosure when the two parts 122, 124 are closed together, as in FIG. 23. The first half or part 122 of the enclosure additionally has side runner grooves 134, 135 (see FIG. 25) which extend from a respective side of one cavity 132 to the corresponding side of the other cavity 132 at the opposite end of the chamber. The cavities 132 and grooves 134, 135 together seat a combined cable and face seal device 110 which is similar or identical to that illustrated in FIG. 22, and like reference numerals have been used for like parts as appropriate. As illustrated in FIGS. 24 and 25, a first part 115 of a cable seal is seated in the cavity 132 at each end of flat face 125 of the first part 122 of pod 120, and side runner seals or face seals 76,77 are seated in the side runner grooves 134, 135 and each extend from one location on the outer surface of one seal part 115 up to the corresponding location on the outer surface of the other seal part 115 at the opposite end of the enclosure. The second, wedge-like parts 116 of each cable seal are seated in the opposing cavities 132 in the flat face 126 of the second part 124 of the enclosure, and may be releasably retained in position by any suitable means, such as temporary adhesive, prior to closing the enclosure.

As illustrated in FIGS. 24 and 25, the first part 122 of the enclosure also has a series of ports 136 extending through its side wall opposite to hinges 127, and each port 136 is closed on its outer face by a respective cable junction or connector device 140. Device 140 may be an underwater connector unit which is releasably mateable with a corresponding or mating underwater connector unit (not illustrated) at the end of a connecting cable. Alternatively, device 140 may be a cable termination or penetrator. Device 140 is shown schematically, and it may be understood that any suitable underwater mateable connector, cable termination, or penetrator may be used for device 140, such as the plug or receptacle unit of the underwater connectors described in U.S. Pat. Nos. 5,645,442, 5,738,535, 5,873,750, 6,017,227, 6,315,461, 6,332,787, 6,464,405, 6,736,745, and 6,796,821, for example, with the mating connector unit connected to the end of a second cable to be connected to the pod. A cable segment or jumper 142 extends from each connector unit 140 through the respective port 136 up to a junction or splice 144 with cable 71 in chamber 128, as illustrated in FIG. 24. It may be understood that suitable jumpers 142 could be installed as needed between the underwater mateable connector units or other cable junction devices 140 and conductors within cable 71, so that circuits 74 in one or more second cables may be connected to circuits in the cable 71. Although three ports 136 and associated underwater connectors or penetrators 140 are shown in FIGS. 23 to 25, it is understood that a greater or lesser number of connectorized ports 136 may be provided in alternative embodiments.

As in the previous embodiment, a segment of cable 71 may first be seated in the first part 122 of the enclosure with the enclosure in a hinged open position, as in FIG. 24. The cable segment is positioned to extend between the opposite ends of chamber 128 and is seated in the respective seal parts 115 and semi-cylindrical grooves at opposite ends of the surface 125 of the enclosure part 122. When the canister parts 122 and 124 are closed and clamped, the opposing parts 115, 116 of the split cable seals are pressed together, completely sealing to one another and to the cable and the cavity in which the seal parts are housed. At the same time, the enclosure is sealed by the face or side runner seals 76, 77 which are squeezed between the side runner grooves in face 125 and the opposing face 126, in the same manner as described above in connection with the embodiment of FIGS. 13 to 18.

In the illustrated embodiment, the first part 122 of pod 120 is formed by two separate members, comprising a first member 148 which is similar in shape to part 124, and a second member 150 comprising an equatorial plate or rim member which is secured between part 122 and member 148. A continuous face seal 151 may be provided between the opposing faces of the member 148 and equatorial plate or rim member 150. The ports 136 and connector units are provided in rim member 150. It should be understood that separate members 148 and 150 may be formed integrally in alternative embodiments. Purge and fill ports 152 into chamber 128 are sealed by removable plugs 154 which can be removed to allow purging of the chamber 128 with various fluids, as desired. Similar purge and fill ports can be provided in the embodiments of FIGS. 13 to 22.

When the two parts of the pod or junction box 120 are clamped together, the assembly forms a completely sealed chamber. Cable grips 145 may be provided at each end of the pod or box 120 to keep the cable 71 in place. A base (not illustrated) may also be provided to keep the pod, particularly connector units 140, out of any sediment in the water or sea bed and in an accessible position. Such a system may be used for various applications, including serving as a junction box which is field-installable without requiring severing of a cable.

Although the above embodiments describe sealing of a cable which passes through an enclosure, it should be noted that this sealing arrangement can also be used to pass a cable into an enclosure without it having to exit the enclosure at a different point. One example of this would be a situation in which a cable (or other shaft) has a large instrument connected at one end, and the other end is inaccessible. The seal arrangements in the embodiments described above may be used to seal the end of the cable in a pressure enclosure, particularly where the instrument is too big to allow the passage of a seal over it and onto the cable. In this case, the canister or enclosure will be large enough to contain the instrument, and have an opening or port as at one end of the canister in any of FIGS. 14 to 21 through which the cable extends, with a cable end seal in a cavity and a face seal or side runner seal extending around the remainder of the junction between the two part of the enclosure from one side of the cable end seal to the other side.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are, therefore, representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

The invention claimed is:

1. A cable seal assembly, comprising:
    an outer housing having a through bore of a first diameter;
    an annular seating cavity in the though bore having opposite axial end walls and an inner surface of a second diameter greater than the first diameter;
    a cable extending through the bore in the housing, the cable having an outer surface of diameter slightly less than the first diameter; and
    a tubular seal member of elastomeric material, the seal member having at least one axial slit thereby forming opposing radially extending surfaces of the seal member, the seal member seated in the cavity and squeezed between the outer surface of the cable and the opposing inner surface of the cavity, the seal member having an inner surface which directly engages and seals against the outer surface of the cable and an outer surface which directly engages and seals against the inner surface of the annular seating cavity of the housing, and opposite axial end faces; and
    the seal member having a radial cross sectional area in a non-squeezed condition greater than the radial cross sectional area defined between the outer surface of the cable and the inner surface of the cavity, whereby pressure is induced between the inner and outer surfaces of the seal, the opposing radially extending surfaces at the axial slit, and the opposing surfaces of the cable and cavity when the cable is extended through the seal member.

2. The assembly as claimed in claim 1, wherein the seal member has two axial slits dividing the seal member into two separate, partially tubular parts, each slit having opposing radially extending surfaces for face-to-face sealing engagement when the seal member is squeezed between the cable and inner surface of the cavity.

3. The assembly as claimed in claim 2, wherein one part of the seal member is larger than the other, smaller part.

4. The assembly as claimed in claim 3, wherein the smaller part of the seal member is of wedge-like cross-sectional shape.

5. The assembly as claimed in claim 1, wherein the seal member has opposite axial ends which are rounded.

6. The assembly as claimed in claim 1, wherein the seal member has a predetermined axial length and radial thickness, the axial length being greater than the radial thickness.

7. The assembly as claimed in claim 6, wherein the axial length of the seal member is less than the axial length of the annular cavity in which it is seated.

8. The assembly as claimed in claim 1, further comprising a back-up ring seated over the cable and in the groove between one axial end face of the seal member and the adjacent axial end wall of the seating cavity, the back-up ring being of harder material than the seal member.

9. The assembly as claimed in claim 1, wherein the seal member is of elastomeric, substantially incompressible material.

10. The assembly as claimed in claim 1, wherein the inner and outer surfaces of the seal member are generally cylindrical surfaces for conforming to the opposing outer surface of the cable and inner surface of the cavity, respectively.

11. A cable seal assembly for sealing a segment of a cable, comprising:
  a canister having first and second parts moveable between open and closed positions, the first and second parts in the closed position defining an internal chamber having opposite sides and first and second axial end walls and the canister having at least a first end port through the first axial end wall of the chamber communicating with the internal chamber, the end port being adapted for receiving a cable extending into the canister;
  the end port having an enlarged annular recess having an inner surface and opposite axial end walls; and
  a combined cable seal and face seal device of elastomeric material mounted between the canister parts and configured to provide a seal between the first and second parts and between the cable and end port;
  the seal device having at least a first tubular cable seal having an outer surface, an inner surface which seals directly against an outer surface of cable extending through the first end port into the canister, and opposite axial ends, the cable seal being seated in the annular recess in the first end port of the chamber with the outer surface in direct engagement with the inner surface of the annular recess in the first end port, whereby the cable seal is squeezed between the inner surface of the annular recess and the outer surface of the cable when the canister is in the closed position; and
  a side runner seal having a first portion running from a first location on the first cable seal along one side of the chamber to the second end of the chamber and a second portion running from a second location on the first cable seal along the opposite side of the chamber to the second end of the chamber.

12. The cable seal assembly of claim 11, wherein the canister has a second end port in the second axial end wall of the chamber adapted for receiving the cable passing through the canister, the second end port having an enlarged annular recess having an inner surface and axial end walls, the seal device has a second tubular cable seal seated in the second end port of the canister for sealing engagement over the cable extending through the second end port, the first portion of the side runner seal has a first end connected to a first location of the first cable seal and a second end connected to a first location on the second cable seal and runs between the cable seals along one side of the chamber, and the second portion of the side runner seal has a first end connected to a second location on the first cable seal and a second end connected to a second location on the second cable seal and running between the cable seals along the opposite side of the chamber.

13. The cable seal assembly of claim 12, wherein the first and second parts of the canister have opposing first and second faces, respectively, which are in substantial face-to-face engagement when the canister is in the closed position, the end ports and recesses being defined between the opposing first and second faces.

14. The cable seal assembly of claim 13, wherein the first face has first and second side runner grooves extending between the annular recesses on opposite sides of the chamber and the first and second side runner seal portions are seated in the first and second side runner grooves, respectively.

15. The cable seal assembly of claim 14, wherein each side runner seal portion is of elongated cross-sectional shape in a direction transverse to the side runner groove in which it is seated, and the side runner groove is of corresponding elongated cross-sectional shape to the respective side runner seal and has a transverse width greater than the transverse width of the side runner seal.

16. The cable seal assembly of claim 15, wherein each side runner seal portion has opposing faces for sealing engagement with the side runner groove and an opposing portion of the second face when the canister is in the closed position, the thickness of the side runner seal portion between the opposing faces when the canister is in the open position being greater than the depth of the side runner groove, whereby the side runner seal portions are squeezed into a sealing condition when the canister is in the closed position.

17. The cable seal assembly of claim 16, wherein the opposing faces of each side runner seal portion are substantially flat and the opposing portions of the second face are also substantially flat.

18. The assembly as claimed in claim 11, wherein the cable seal has at least one axial slit having opposing faces which are in face-to-face sealing engagement when the cable seal is squeezed between the cable and inner surface of the annular cavity in the end port.

19. The cable seal assembly of claim 18, wherein the slit is offset from the junction between the cable seal and the side runner seal.

20. The assembly as claimed in claim 18, wherein the cable seal has two axial slits dividing the seal member into two separate parts, each slit having opposing surfaces for face-to-face sealing engagement when the cable seal is squeezed between the cable and inner surface of the cavity.

21. The assembly as claimed in claim 20, wherein one part of the cable seal is larger than the other, smaller part.

22. The assembly as claimed in claim 21, wherein the smaller part of the cable seal is of wedge-like shape.

23. The cable seal assembly of claim 20, wherein the slits are offset from the junction between the cable seal and side runner seal.

24. The cable seal assembly of claim 20, further comprising a two part back-up ring of more rigid material than the cable seal seated in each annular recess between one axial end wall of the cable seal and adjacent axial end wall of the recess.

25. The assembly of claim 11, wherein the cable seal has opposite axial ends which are rounded.

26. The assembly of claim 11, wherein the cable seal has a predetermined axial length and radial thickness, the axial length being greater than the radial thickness.

27. The assembly of claim 26, wherein the axial length of the seal member is less than the axial length of the annular recess in which it is seated.

28. The assembly of claim 11, wherein the seal device is of elastomeric, substantially incompressible material.

29. The assembly of claim 11, wherein the inner and outer surfaces of the seal member are generally cylindrical surfaces for conforming to the opposing outer surface of the cable and inner surface of the cavity, respectively.

30. The cable assembly of claim 11, further compromising a gap between an axial end face of the cable seal and at least one axial end wall of the annular recess in which the cable seal is seated.

31. The cable seal assembly of claim 30, further comprising a back-up ring of more rigid material than the seal device mounted in the gap between one axial end face of the cable seal and an adjacent axial end wall of the annular recess closest to the chamber, the back-up ring being adapted to conform to the outer surface of a cable extending through the recess.

32. The cable seal assembly of claim 11, wherein the side runner seal is of circular cross-section.

33. The cable seal assembly of claim 11, wherein the side runner seal is of elongated cross-sectional shape in a direction transverse to the length of the side runner seal.

34. The cable seal assembly of claim 11, wherein one of said parts has at least one additional port spaced from said end port for communicating with said chamber, and an underwater mateable cable junction device is coupled with said additional port on the outside of said canister for connecting a second cable to said chamber.

35. The cable seal assembly of claim 34, wherein the cable junction device is an underwater mateable connector unit.

36. The cable seal assembly of claim 34, wherein the cable junction device is a cable penetrator.

37. The cable seal assembly of claim 34, wherein said one part has a plurality of additional ports and associated cable junction devices coupled with said additional ports, whereby said canister comprises a field-installable junction box.

38. The cable seal assembly of claim 34, further comprising a jumper extending between the cable junction device and the cable.

39. The cable seal assembly of claim 11, wherein said canister has fill and purge ports communicating with said canister and removable seal caps closing said fill and purge ports.

40. A cable seal, comprising:
a tubular member of elastomeric material for engagement over a cable, the member having an inner sealing face, an outer sealing face, and opposite axial ends;
the annular member having a length between the axial ends which is greater than a radial thickness between the inner and outer sealing faces; and
at least one axial slit extending along the length of the annular member between the inner and outer sealing faces wherein the axial slit has opposite faces for face-to-face sealing engagement;
whereby the seal can be installed transversely over the cable by separating the seal at the axial slit.

41. The seal of claim 40, wherein the annular member has two spaced axial slits separating the member into first and second parts, the first part being larger than the second part.

42. The seal of claim 40, wherein the annular member has rounded axial ends.

43. A seal device for simultaneous sealing of multiple interfaces, comprising:
first and second spaced tubular seal members aligned along a central longitudinal axis, each seal member having inner and outer sealing faces and opposite axial ends;
a first elongate side runner seal having a first end secured to a first location on the first tubular seal member and a second end secured to a first location on the second tubular seal member; and
a second elongate side runner seal having a first end secured to a second location on the first tubular seal member and a second end secured to a second location on the second tubular seal member, the second location being spaced from the first location on each tubular seal member;
whereby the tubular seal members comprise cable seal members which provide sealing of a cable extending along the central longitudinal axis and through the seal members and the side runner seals provide simultaneous sealing between opposing surfaces of an enclosure for a segment of the cable extending between said tubular seal members.

44. The device as claimed in claim 43, wherein each side runner seal is of round cross section.

45. The device as claimed in claim 43, wherein each side runner seal is of elongate cross section.

46. The device as claimed in claim 45, wherein each side runner seal has substantially flat first and second sealing faces and opposite inner and outer ends.

47. The device as claimed in claim 43, wherein the tubular seal members and side runner seal members are formed integrally.

48. The device as claimed in claim 43, wherein each tubular seal member has at least one axial slit extending between the opposite axial ends at a location offset from the first and second locations.

49. The device as claimed in claim 48, wherein each tubular seal member has two spaced axial slits each offset from the first and second locations and separating the seal member into a first part to which said side runner seals are connected and a second, smaller part.

50. A cable sealing method, comprising:
engaging a tubular elastomeric seal member having at least one axial slit, thereby forming opposing radial faces of the axial slit, transversely over a cable, with an inner sealing surface of the seal member directly engaging the outer surface of the cable;
enclosing the seal member in an outer housing having a cable through bore and an annular cavity in the through bore for receiving the seal member whereby an outer sealing surface of the seal member directly engages an inner surface of the cavity between opposite axial end walls of the cavity, the cross-sectional area between the opposing surfaces of the cable and the cavity being less than the cross-sectional area of the seal member in a relaxed condition; and squeezing the seal between the opposing surfaces of the cable and cavity to provide a sealing pressure between the inner surface of the cavity and the outer sealing surface of the seal member and between the outer surface of the cable and the inner sealing surface of the seal member, and a sealing pressure between opposing radial faces of the axial slit.

51. The method of claim 50, wherein the step of enclosing the seal member comprises positioning the seal member in the cavity such that there is a gap between at least a first axial end of the seal member and a first axial end wall of the cavity when the seal member is squeezed between the opposing surfaces of the cable and cavity.

52. The method of claim 51, further comprising the step of engaging a back-up ring of more rigid material than the seal member over the cable adjacent the first axial end of the seal member, the step of enclosing the seal member in the annular cavity further comprising enclosing the back-up ring in the gap between the first axial end of the seal member and first radial axial end of the cavity.

53. The method as claimed in claim 50, wherein the step of engaging the seal member over the cable comprises seating the cable against a first, partially cylindrical part of the seal member having radial end faces with a part-annular gap between the end faces extending around the exposed portion of the outer surface of the cable, and seating a separate, second partially cylindrical part of the seal member having radial end faces in the gap between the end faces of the first part, and the step of squeezing the seal member between the opposing faces of the cable and cavity also squeezes the end faces of the two seal parts together with substantially the same sealing pressure.

54. A cable sealing method, comprising:
engaging first and second spaced, aligned tubular seal members of elastomeric material over a cable;
engaging the seal members in spaced first and second seating recesses in end portions of a first part of a canister, the seating recesses comprising semi-cylindrical grooves each having an inner semi-cylindrical face and opposite axial end walls;
engaging a first elongate side runner seal extending between first locations on the outer surfaces of the seal members in a first side runner groove extending between the seating recesses and along a first side rim of the first part which is located on one side of a first chamber-forming cavity in the first part;
engaging a second elongate side runner seal extending between second locations on the outer surfaces of the seal members in a second side runner groove in the first face extending between the seating recesses and along a second side rim of the first part which is located on the opposite side of the first chamber-forming cavity from the first side rim;
closing a second part of the canister over the first part of the canister with a second chamber-forming cavity in the second part aligned with the first chamber-forming cavity to form a chamber receiving the cable segment extending between the tubular seal members, and with spaced semi-cylindrical seating recesses in end portions of the second part aligned with the seating recesses in the first part;

squeezing the tubular seal members between opposing surfaces of the seating recesses and cable whereby an outer surface of each tubular seal member is in face-to-face sealing engagement with the opposing semi-cylindrical surface of the respective seating recess and the inner surface of each tubular seal member is in face-to-face sealing engagement with the opposing outer surface of the cable; and simultaneously squeezing the side runner seals between opposing portions of the second canister part and side runner grooves in the first canister part to seal the interface between the first and second canister parts.

55. The method as claimed in claim 54, wherein the step of engaging the tubular seal members over a cable comprises engaging the seal members transversely over the cable via an axial slit in each seal member.

56. The method as claimed in claim 54, wherein the step of engaging the tubular seal members over the cable comprises seating a first part of each seal member in a respective seating recess, the first part being of partial annular cross-section and having spaced end faces with a gap between the end faces, seating the cable against inner surfaces of the seated first parts of the seal members, and seating a separate, second part of each seal member over the exposed surface of the cable in the gap between the end faces of the first part of the respective seal member.

57. The method as claimed in claim 54, wherein the step of seating the second part of each seal member comprises retaining each second seal part in a respective seating recess of the second canister part and closing the second canister part over the first canister part such that the second seal parts register with the gaps in the respective first seal parts.

58. The method as claimed in claim 54, further comprising engaging a first back-up ring over the cable adjacent a first end of the first tubular seal member facing the second tubular seal member, and engaging a second back-up ring over the cable adjacent a first end of the second tubular seal member facing the first tubular seal member, and the step of engaging the seal members in the seating recesses comprises engaging the first tubular seal member and back-up ring in the first seating recess and engaging the second tubular seal member and back-up ring in the second seating recesses.

59. The method as claimed in claim 54, further comprising the step of securing the end of a second cable to a cable access port in one canister part which is oriented in a direction generally transverse to the first cable and connecting media in the second cable to corresponding media in the first cable segment inside the chamber via a jumper between the first cable and cable access port.

60. The method as claimed in claim 59, wherein the second cable is secured to the cable access port via an underwater junction device.

* * * * *